United States Patent [19]

Kiyohara et al.

[11] Patent Number: 5,508,823
[45] Date of Patent: Apr. 16, 1996

[54] IMAGE PROCESSING METHOD AND APPARATUS

[75] Inventors: Takahiro Kiyohara, Machida; Masami Kato, Yokohama, both of Japan

[73] Assignee: Canon Kabushiki Kaisha, Tokyo, Japan

[21] Appl. No.: 935,409

[22] Filed: Aug. 26, 1992

[30]     Foreign Application Priority Data

Aug. 28, 1991 [JP] Japan ................... 3-217155
Oct. 9, 1991 [JP] Japan ................... 3-290931
Nov. 25, 1991 [JP] Japan ................... 3-308860
May 21, 1992 [JP] Japan ................... 4-128553

[51] Int. Cl.$^6$ ........................... H04N 1/40
[52] U.S. Cl. ............. 358/463; 358/447; 358/533
[58] Field of Search ................. 358/463, 75, 166, 358/167, 443, 284, 280, 79, 447, 448, 530, 464, 467, 537, 465, 52, 533, 462; 382/9, 22, 54, 56; 271/11, 96, 103, 108, 110

[56]              References Cited

U.S. PATENT DOCUMENTS

| | | | |
|---|---|---|---|
| 5,023,919 | 6/1991 | Wataya | 382/54 |
| 5,126,838 | 6/1992 | Ohsawa et al. | 358/75 |
| 5,130,820 | 7/1992 | Hirota | 358/447 |
| 5,213,320 | 5/1993 | Hirota et al. | 271/11 |
| 5,282,000 | 1/1994 | Miyake et al. | 355/208 |
| 5,289,296 | 2/1994 | Yamada | 358/530 |
| 5,311,328 | 5/1994 | Murata | 358/447 |
| 5,317,420 | 5/1994 | Kuwahara | 358/463 |
| 5,339,365 | 8/1994 | Kawai et al. | 382/54 |
| 5,341,227 | 8/1994 | Kumashiro | 358/533 |

*Primary Examiner*—Paul Ip
*Attorney, Agent, or Firm*—Fitzpatrick, Cella, Harper & Scinto

[57]             ABSTRACT

This invention provides an image processing method and apparatus. Two types of edge emphasis processing operations having different degrees of edge emphasis are performed for image data of a read original. When paper quality of the original instructed by an operation unit is recycle paper, the edge emphasis processing having a smaller degree of the two types of edge emphasis processing operations is selected. The selected (multi-value) image data is binary-converted, and the binary-converted image data is output, thereby obtaining good image quality with respect to the read original regardless of the paper quality of the read original.

17 Claims, 47 Drawing Sheets

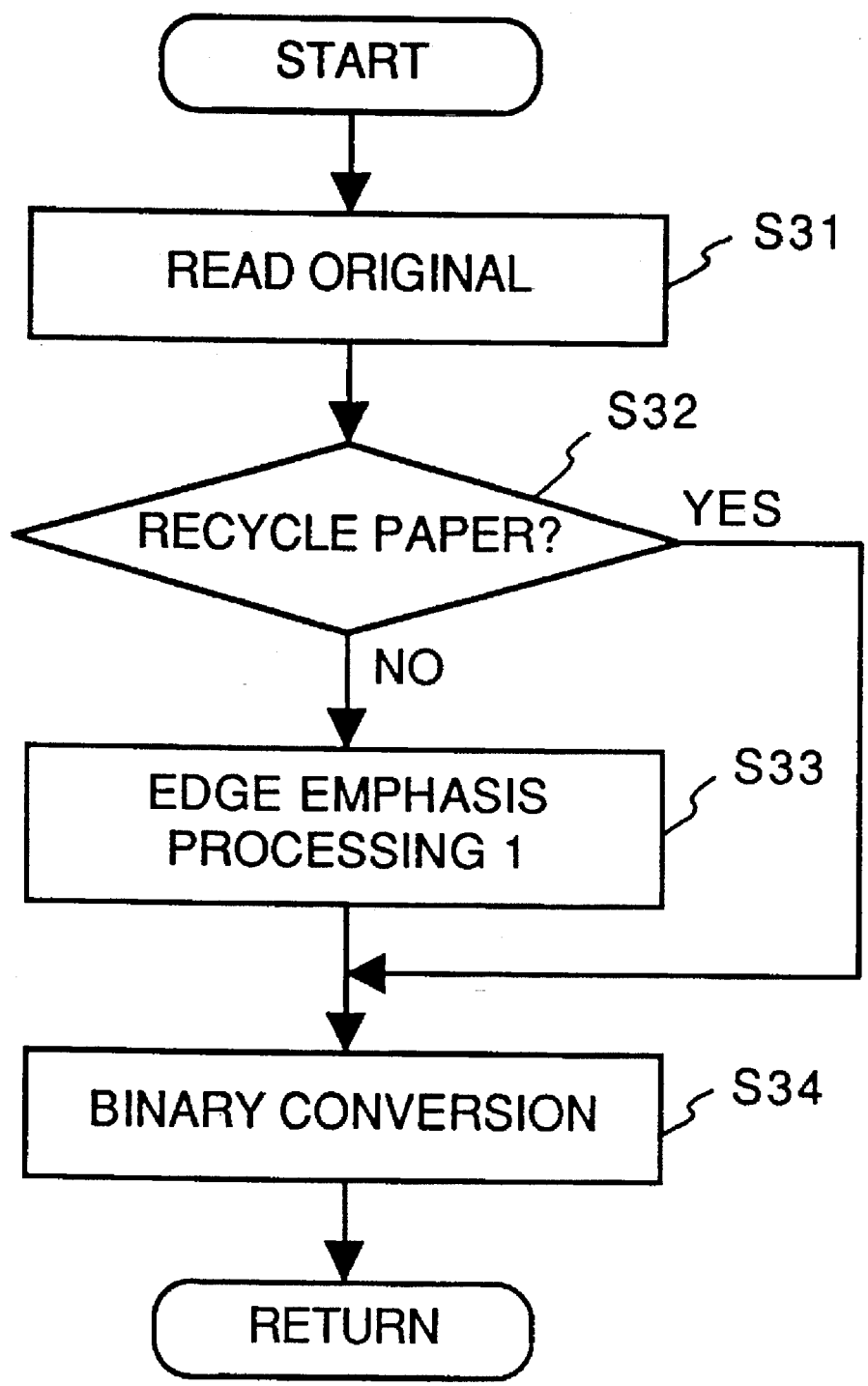
F I G. 15

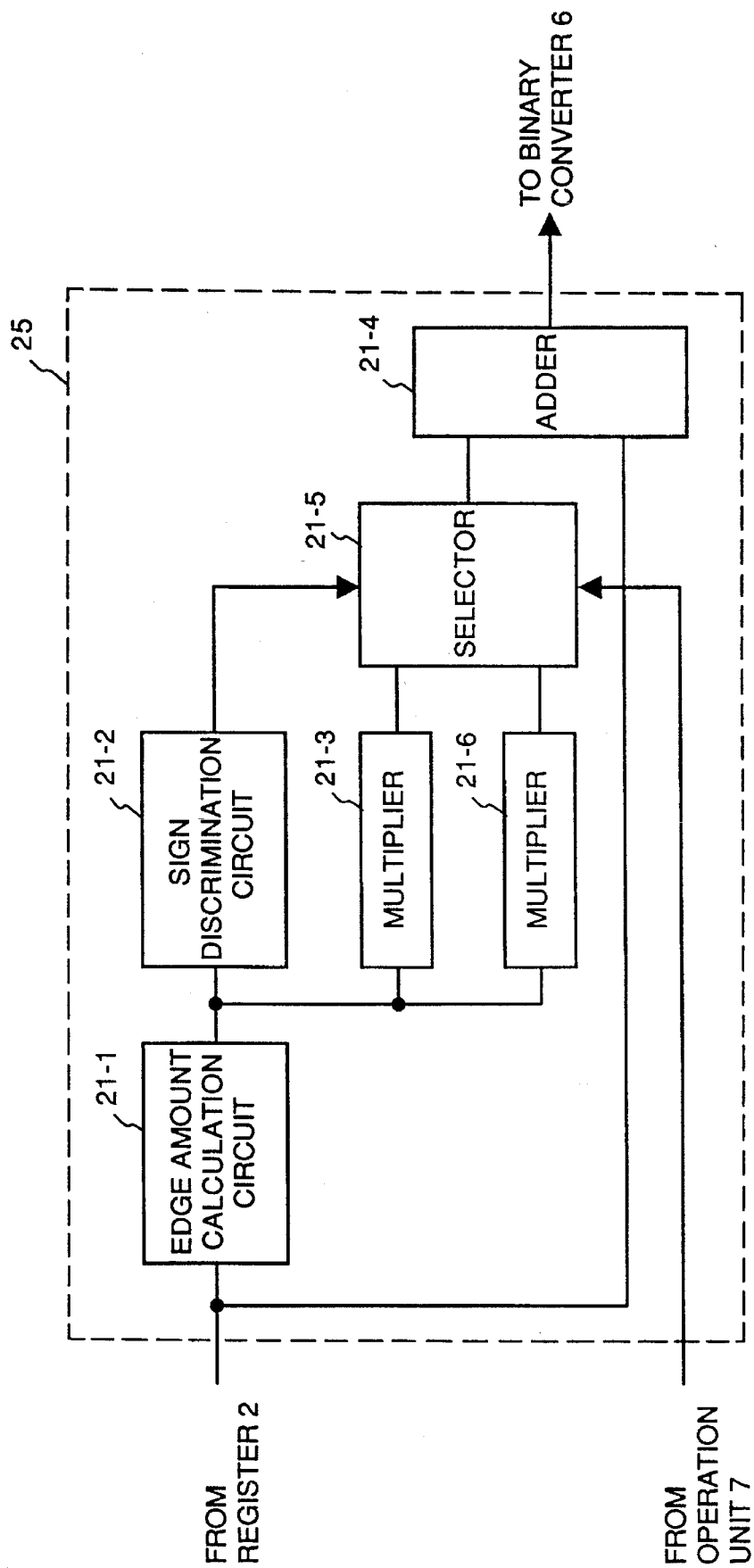
F I G. 19

|   | -1 |   |
|---|---|---|
| -1 | 4 | -1 |
|   | -1 |   |

FIG. 20

→ MAIN SCAN DIRECTION

↓ SUB-SCAN DIRECTION

| A | B | C |
|---|---|---|
| D | E | F |
| G | H | I |

FIG. 24

| 3 | 2 | 2 |
|---|---|---|
| 2 | 20 | 1 |
| 2 | 2 | 2 |

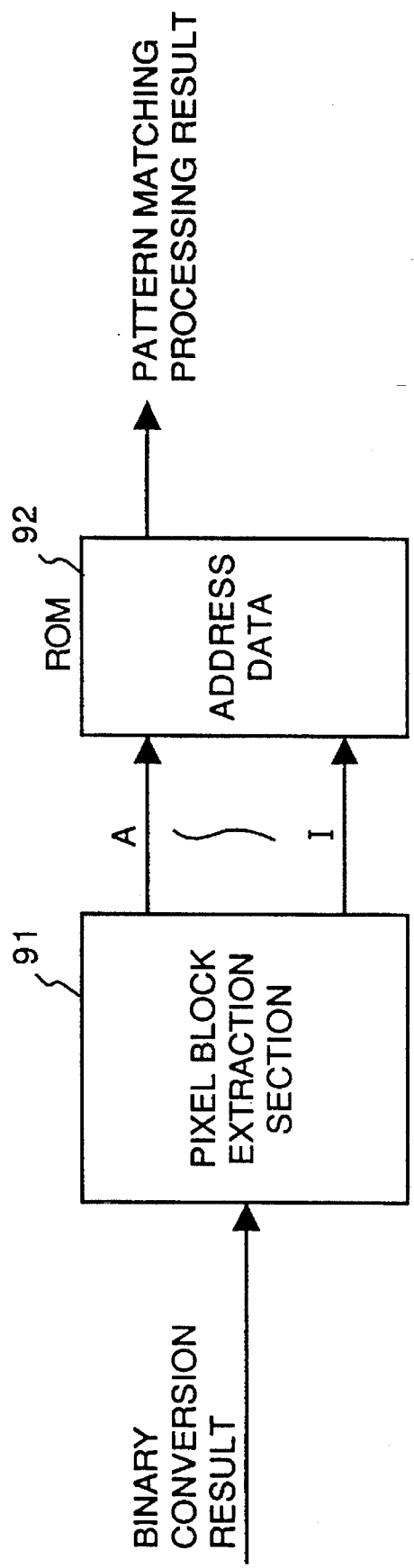
F I G. 29

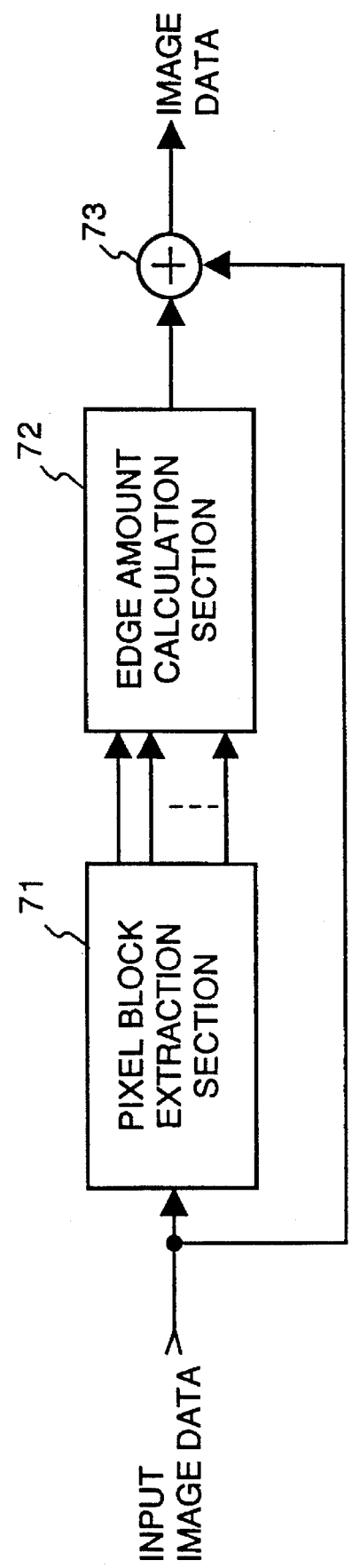
F I G. 30

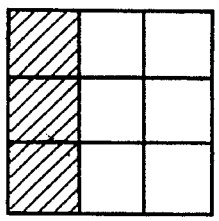 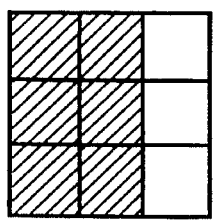 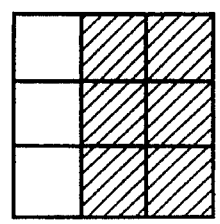 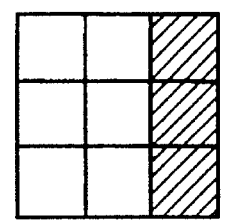
FIG.32A  FIG.32B  FIG.32C  FIG.32D
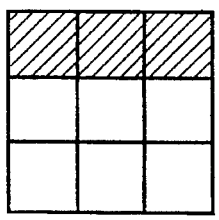 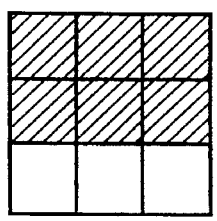 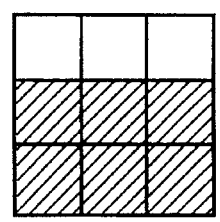 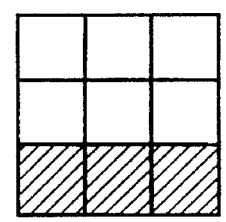
FIG.32E  FIG.32F  FIG.32G  FIG.32H
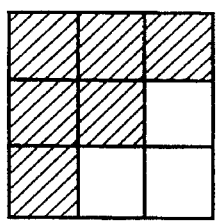 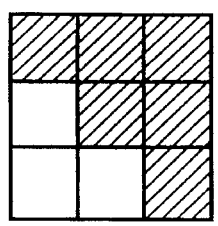 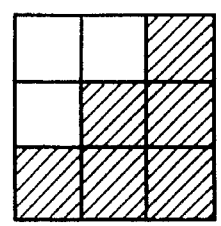 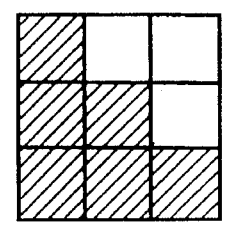
FIG.32I  FIG.32J  FIG.32K  FIG.32L

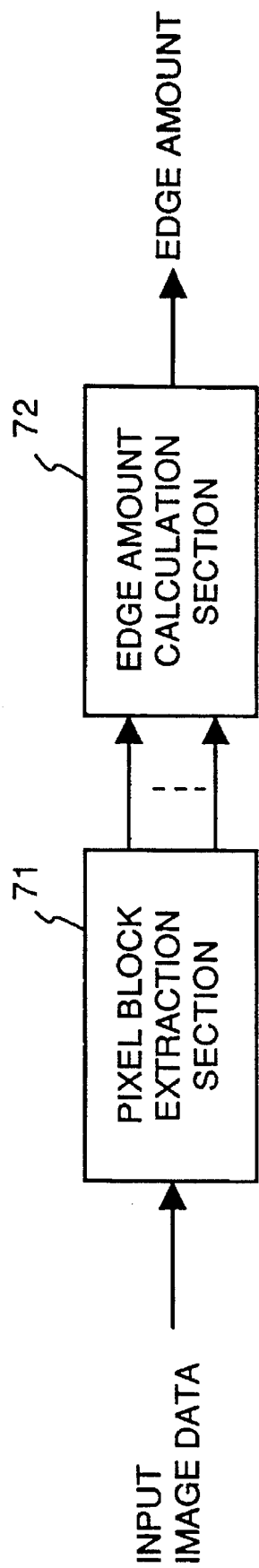
F I G. 34

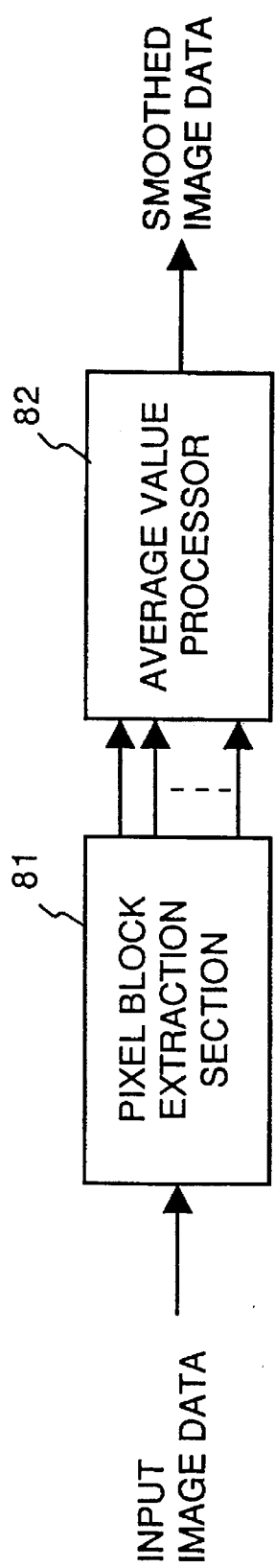

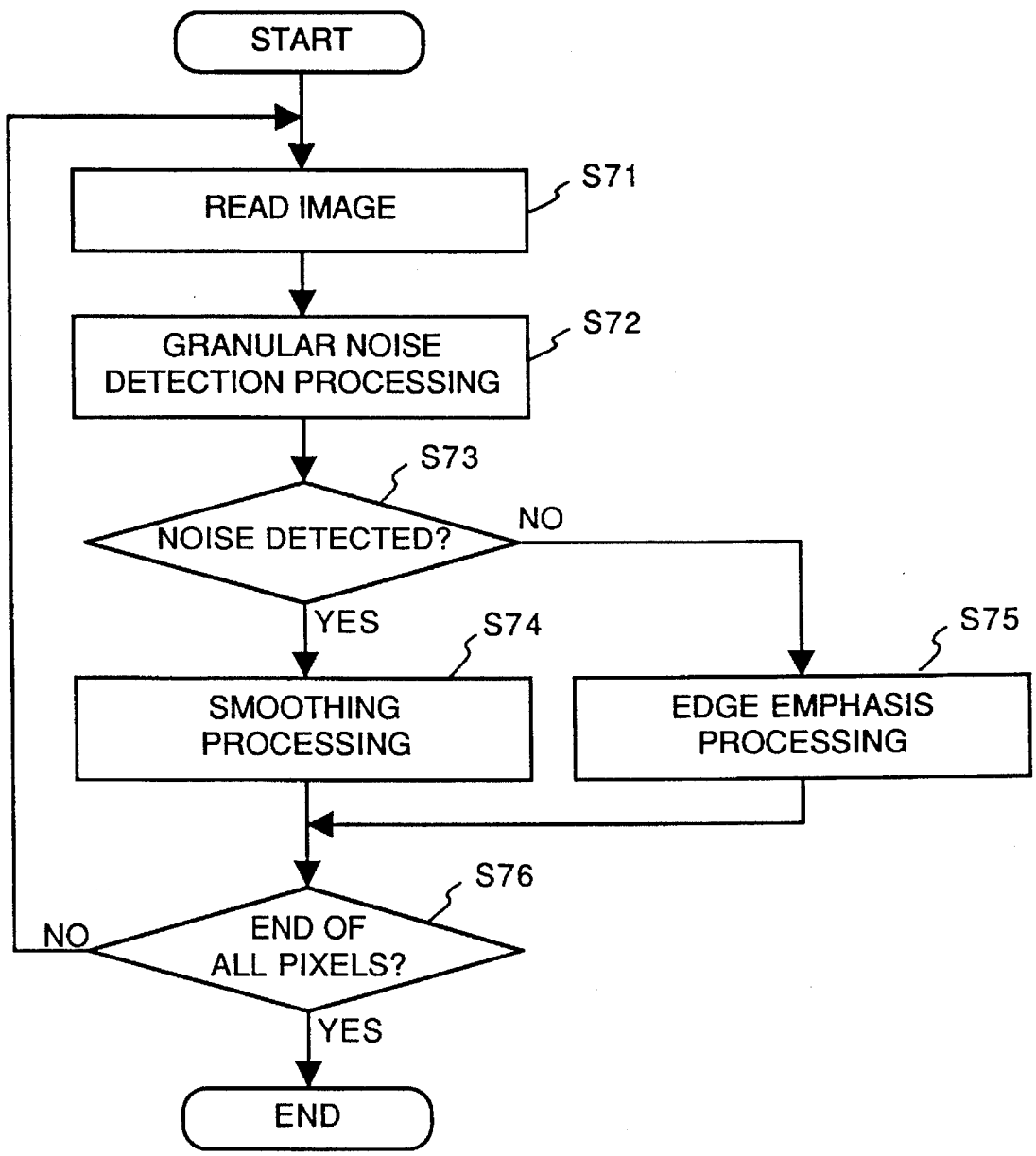
F I G. 39

| -2 | 1 | -2 |
|----|---|----|
| 1  | 4 | 1  |
| -2 | 1 | -2 |

FIG. 41

| 4 | 4 | 4 |
|---|---|---|
| 4 | 8 | 4 |
| 4 | 4 | 4 |

FIG. 42

| 4 | 8 | 4 |
|---|---|---|
| 4 | 8 | 4 |
| 4 | 8 | 4 |

FIG. 43

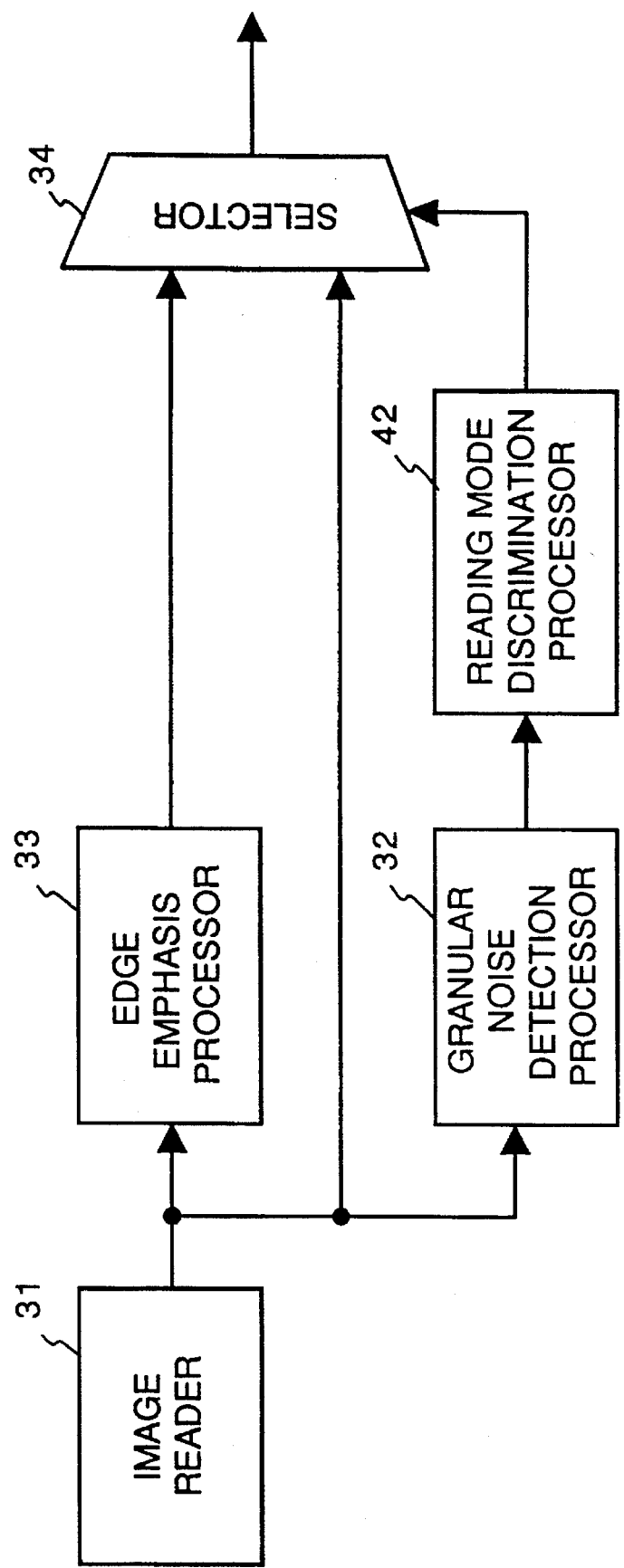
F I G. 45

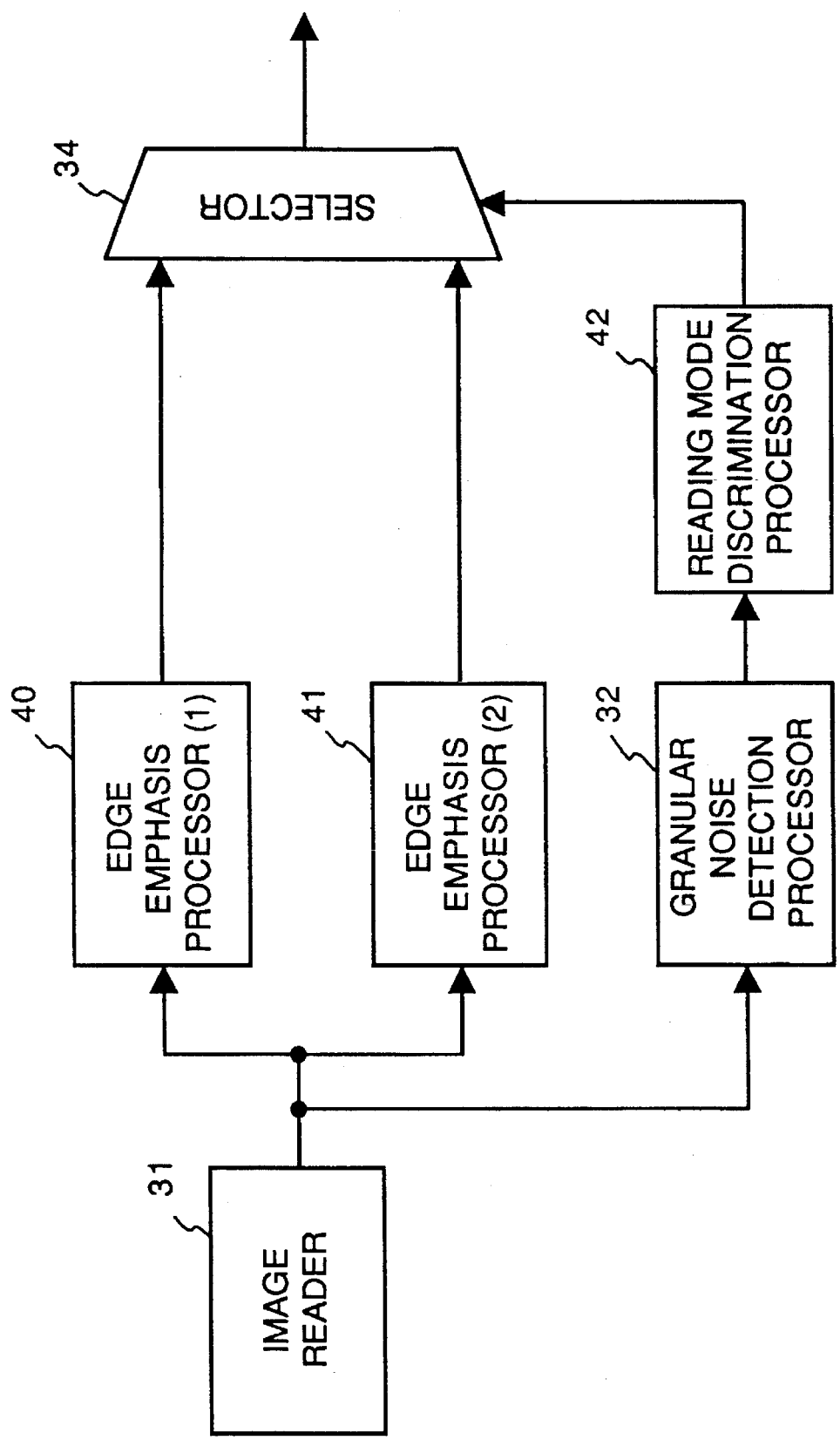
F I G. 50

IMAGE PROCESSING METHOD AND APPARATUS

BACKGROUND OF THE INVENTION

1. Field of the Invention

The present invention relates to an image processing method and apparatus suitable for a facsimile machine, a digital copying machine, and the like, which use, e.g., recycle paper as originals.

2. Description of the Prior Art

In a conventional image processing apparatus such as a facsimile machine, an output value from a Laplacian filter shown in FIG. 20, or a value obtained by weighting an output value obtained by changing the coefficient of the Laplacian filter is added to a pixel of interest as a pixel to be processed, thereby emphasizing the edge of an image.

However, in the prior art, in the edge emphasis processing, the degree of emphasis is increased for a region having a higher spatial frequency. For this reason, when recycle paper popularly used in recent years is read, the noise components on an original are undesirably emphasized. Thus, when the read image is recorded, image quality is deteriorated.

In order to suppress emphasis of the noise components, if no edge emphasis is performed or the degree of emphasis is lowered, the edge portion of a character or figure is blurred, and reproducibility of thin lines is impaired.

On the other hand, when an image on an original having a background color such as newspaper or blue print is to be read, a conventional image processing apparatus performs background noise reduction by a method for forming a density histogram by, e.g., a pre-scan operation, and determining a threshold value upon binary conversion of the read image on the basis of the density histogram, or by processing for detecting an average value of image densities in units of blocks each consisting of a plurality of pixels, and dynamically varying the threshold value upon binary conversion (so-called ABC: Automatic Background Control processing).

In recent years, recycle paper has received a lot of attention for the purpose of effective use of natural resources. However, recycle paper includes many unique granular noise components as compared to high-quality paper. For example, when a conventional facsimile machine reads an image on recycle paper, and binary-converts the read image, granular noise appears on the background, and problems of deterioration of image quality, a decrease in compression ratio upon encoding, and the like are posed.

Even when the above-mentioned ABC (Automatic Background Control) processing is performed for such a recycle paper original, granular noise having a high density cannot be satisfactorily removed. In order to avoid the influence of granular noise, when resolution correction processing (so-called edge emphasis processing) is inhibited, the resolution of the read image is decreased. When the binary-conversion threshold value is changed, an original image having a low density level cannot be reproduced.

SUMMARY OF THE INVENTION

The present invention has been made to solve the above-mentioned problems, and has as its object to provide an image processing method and apparatus, which can obtain high image quality regardless of paper quality of an original.

It is another object of the present invention to provide an image processing method and apparatus, which can suppress generation of noise on an image, and can improve image quality.

It is still another object of the present invention to provide an image processing method and apparatus, which can reduce granular noise generated upon reading of a recycle paper original without influencing the resolution or reproducibility of an original image.

In order to achieve the above objects, the present invention comprises reading means for reading an original, and outputting a read result as image data in units of pixels, instruction means for instructing a type of paper quality of the original, and image processing means for varying a degree of edge emphasis for the image data in units of pixels according to the instruction.

Other objects of the present invention will become apparent from the following detailed description taken in conjunction with the accompanying drawings.

BRIEF DESCRIPTION OF THE DRAWINGS

FIG. 15 is a flow chart showing a processing sequence of the circuit shown in FIG. 14;

FIG. 19 is a block diagram showing a circuit arrangement according to the sixth modification of the first embodiment;

FIG. 20 is a view showing an example of a Laplacian filter;

FIG. 24 is a view showing a format of reference pixels in the second embodiment;

FIG. 29 is a diagram showing an arrangement of a pattern matching processor;

FIG. 30 is a block diagram showing an arrangement of an edge emphasis processor 33 shown in FIG. 21;

FIG. 32 is a view showing edge patterns;

FIG. 34 is a block diagram showing an arrangement of an edge amount calculation processor 35 shown in FIG. 33;

FIG. 37 is a block diagram showing an arrangement of a smoothing processor 39 shown in FIG. 36;

FIG. 38 is a block diagram showing a filter of the smoothing processor 39 shown in FIG. 36;

FIG. 39 is a flow chart showing a processing sequence of the circuit shown in FIG. 36;

FIG. 41 is a block diagram showing a filter of a second edge emphasis processor 40 shown in FIG. 40;

FIG. 42 is a view showing an example of granular noise;

FIG. 43 is a view showing another example of granular noise;

FIG. 45 is a block diagram showing an arrangement according to the fourth modification of the second embodiment;

FIG. 50 is a block diagram showing an arrangement according to the sixth modification of the second embodiment;

DETAILED DESCRIPTION OF THE PREFERRED EMBODIMENTS

The preferred emodiments of the present invention will be described in detail hereinafter with reference to the accompanying drawings.

<First Embodiment>

Figure 1:
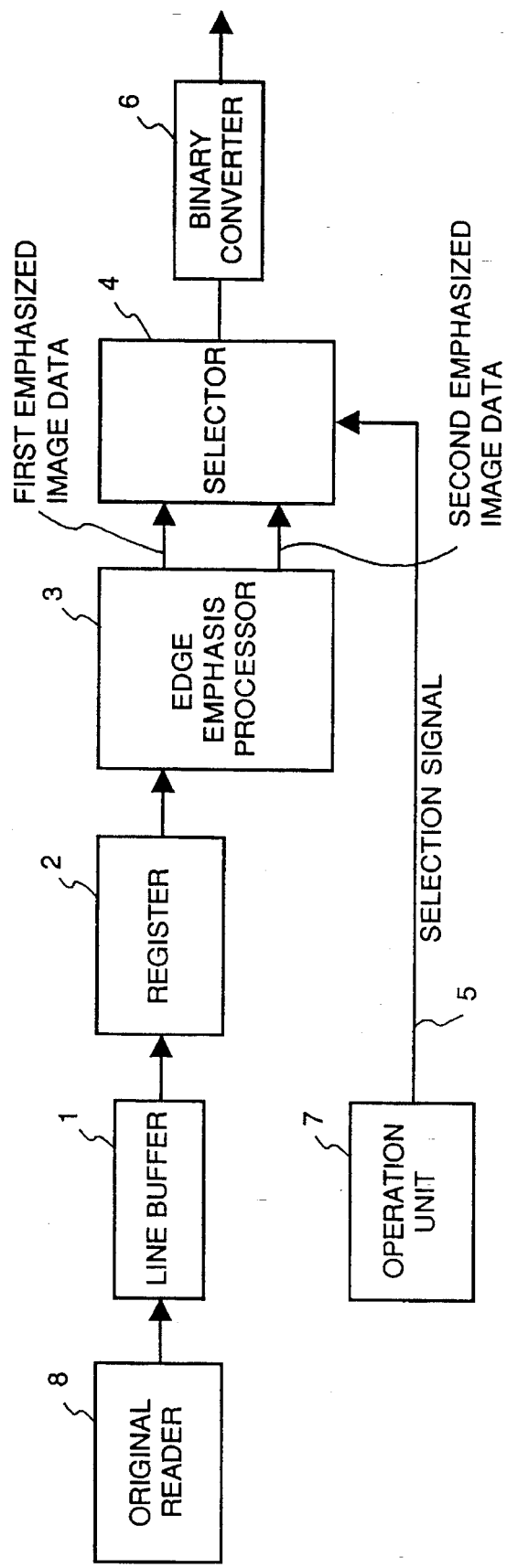
FIG. 1 is a block diagram showing a circuit arrangement according to the first embodiment of the present invention.

FIG. 1 is a Block diagram showing a principal circuit arrangement of the first embodiment. In FIG. 1, reference number 1 denotes a line buffer capable of storing read image data for several lines; and 2, a register for storing a pixel matrix pattern. Reference numeral 3 denotes an edge emphasis processor for performing edge emphasis processing of a pixel of interest. The processor 3 generates two types of pixel data having different degrees of edge emphasis. Reference numeral 4 denotes a selector for selecting one of the two types of (multi-value) edge-emphasized pixel data according to a selection signal 5 generated by a mode switch of an operation unit 7 (to be described later). Reference numeral 6 denotes a binary converter for binary-converting the multi-value pixel data output from the selector 4. Reference numeral 7 denotes an operation unit as the instruction means of the present invention. When recycle paper or high-quality paper is instructed as the type of a read original, the operation unit 7 outputs the corresponding selection signal 5. Reference numeral 8 denotes an original reader.

Figure 2:
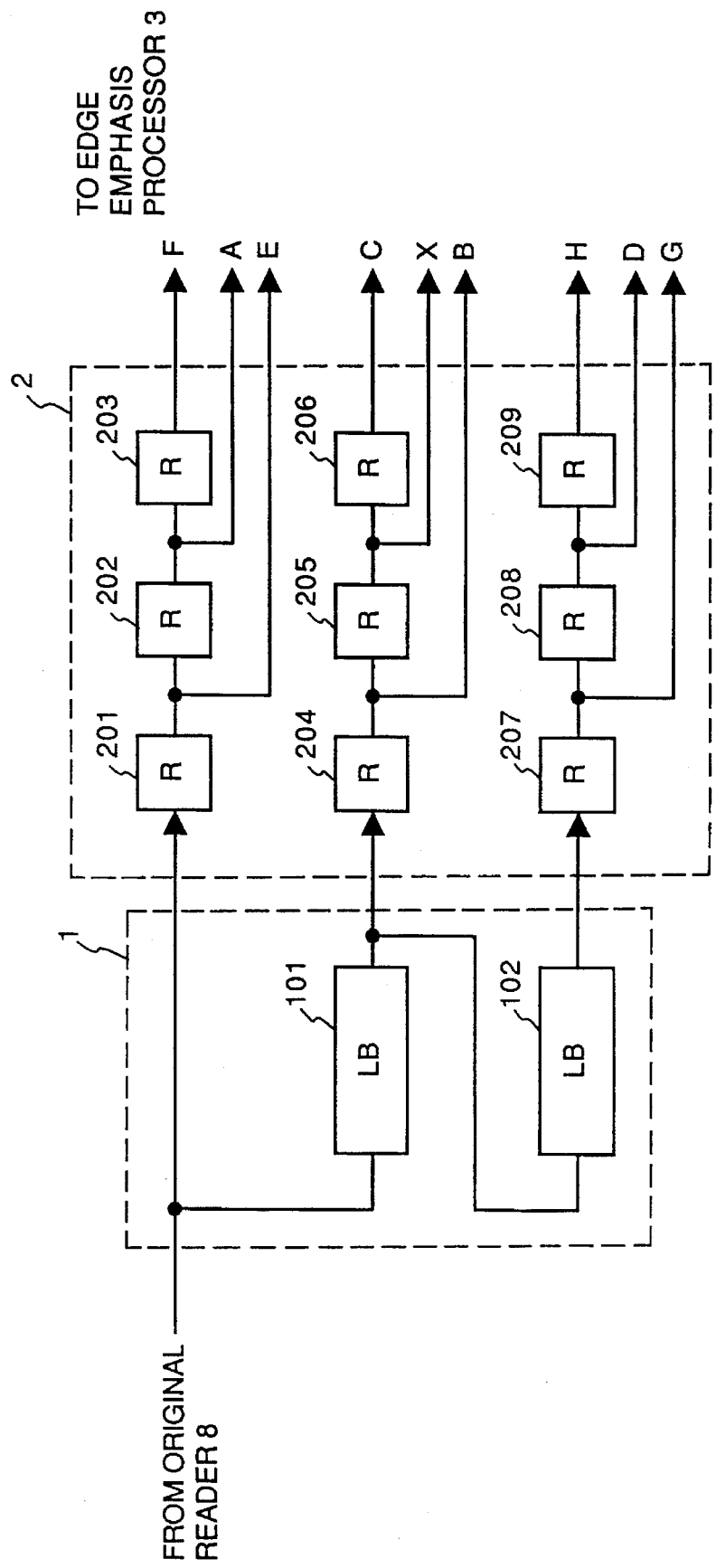
FIG. 2 is a block diagram showing a circuit arrangement of a line buffer 1 and a register 2 shown in FIG. 1.

FIG. 2 is a block diagram showing an internal arrangement of the line buffer 1 and the register 2 described above. In this embodiment, a 3×3 pixel matrix is formed. In FIG. 2, reference numerals 101 and 102 denote line buffers (LBs) each of which can store image data for one line; and 201 to 209, a register matrix for storing the 3×3 pixel matrix pattern.

Figure 3:
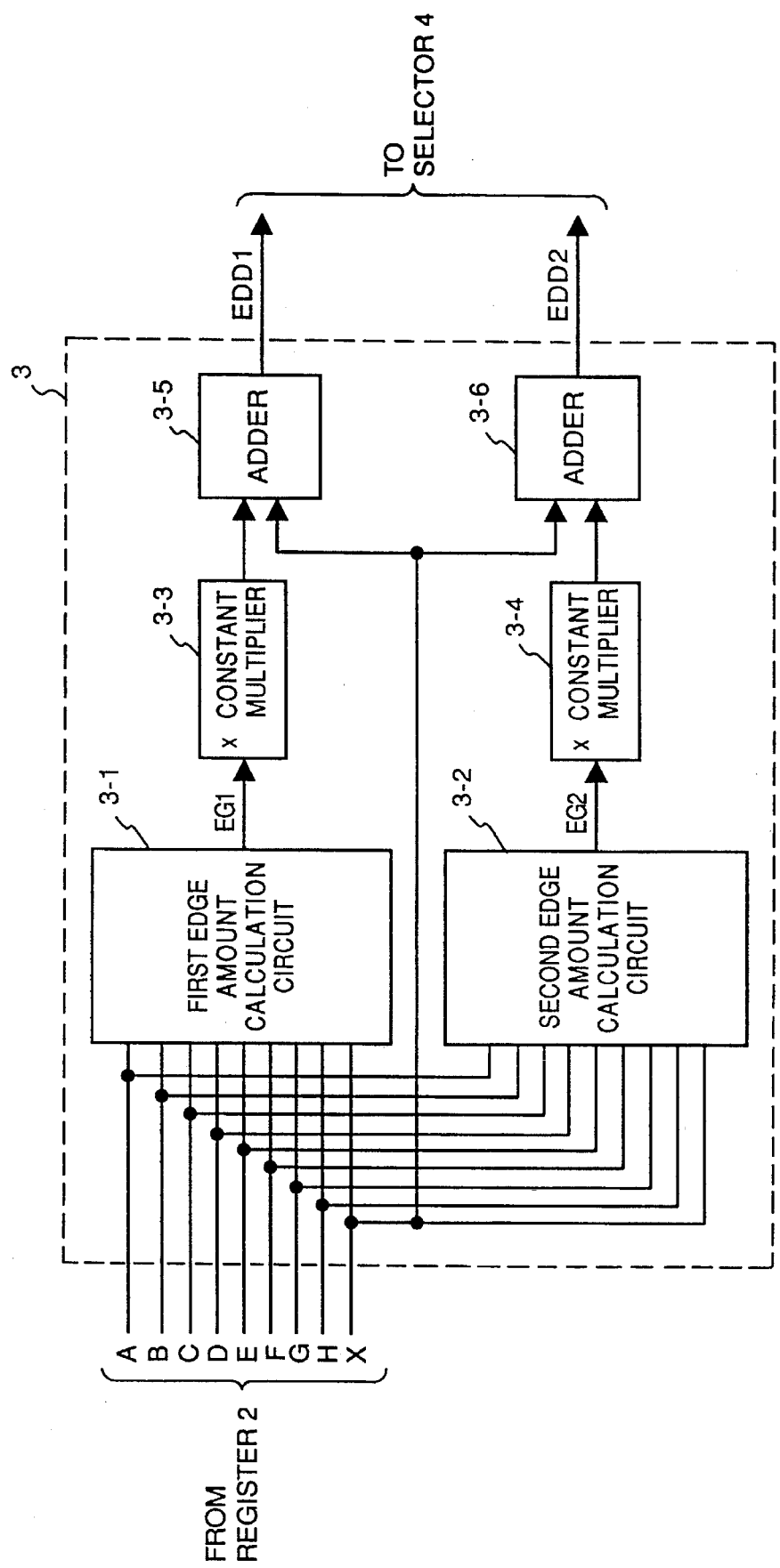
FIG. 3 is a block diagram showing a circuit arrangement of an edge emphasis processor 3 shown in FIG. 1.

FIG. 3 is a block diagram showing a circuit arrangement of the edge emphasis processor 3 described above. In FIG. 3, first and second edge amount calculation circuits 3-1 and 3-2 calculate different edge amounts using the same 3×3 pixel matrix data. An edge amount EG1 output from the first edge amount calculation circuit 3-1 is expressed as the following formula (1):

$$EG1=4X-(A+B+C+D) \qquad (1)$$

An edge amount EG2 output from the second edge amount calculation circuit 3-2 is expressed as the following formula (2):

$$EG2=4X+(E+F+G+H)-2(A+B+C+D) \qquad (2)$$

where X is the data of the pixel of interest, and A to H are the surrounding pixel data.

The edge amounts EG1 and EG2 calculated by the first and second edge amount calculation circuits 3-1 and 3-2 are multiplied with constants by constant multipliers 3-3 and 3-4. Thereafter, each of adders 3-5 and 3-6 adds the original 3×3 pixel matrix data and the data of the pixel of interest to obtain edge-emphasized image data (EDD1, EDD2).

The edge emphasis processing in the circuit arrangement described above will be described below with reference to the flow chart shown in FIG. 4.

Image data read by the original reader 8 is subjected to image processing such as shading correction processing. The image data is then serially transferred to the line buffer 1 in units of pixels (step S11). The line buffer 1 and the register 2 form 3×3 pixel matrix data. The 3×3 pixel matrix data are input to the first and second edge amount calculation circuits 3-1 and 3-2 in the edge emphasis processor 3, and two image data (pixel of interest) having different edge emphasis amounts are generated according to the above-mentioned two formulas.

When the operation unit 7 instructs that recycle paper is used as the type of a read original, the selector 4 selects and outputs image data (EDD1) subjected to the first edge emphasis processing in the edge emphasis processor 3 according to the selection signal 5 (step S12 step S13). On the other hand, when the operation unit 7 selects high-quality paper as the read original, the selector 4 selects and outputs image data (EDD2) subjected to the second edge emphasis processing (step S12 step S14).

Thereafter, the edge-emphasized image data is binary-converted by the binary converter 6, and the converted data is output to an external circuit (step S15).

Figures 4, 5, 6:
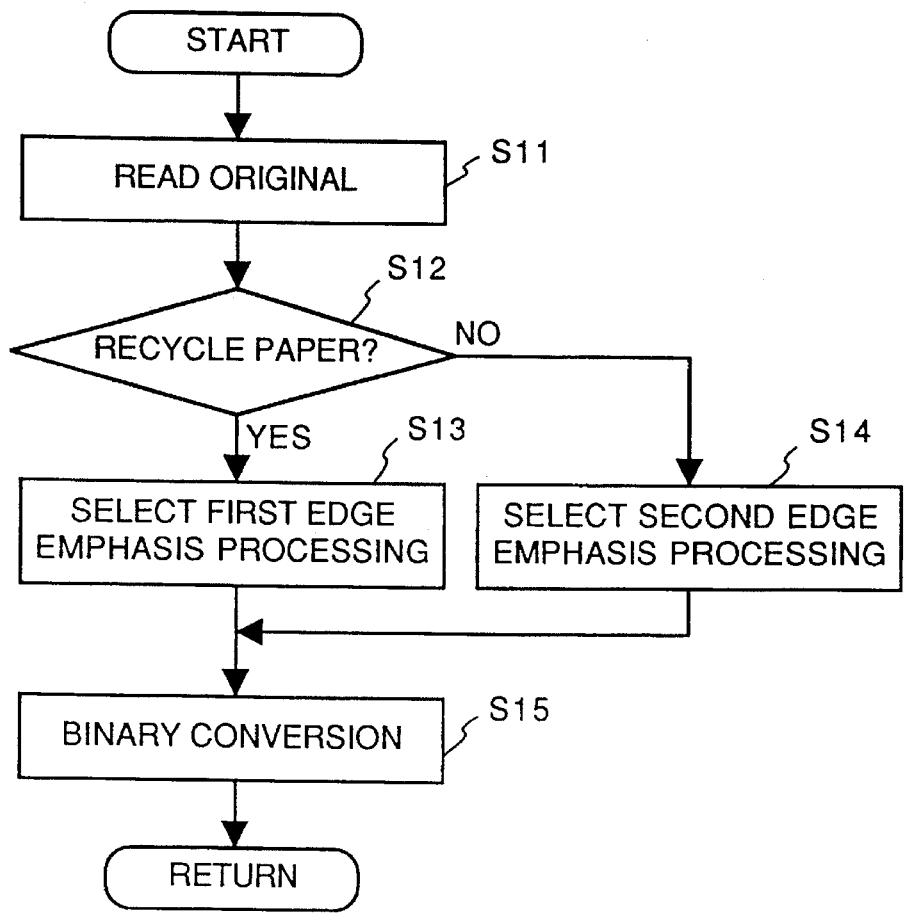
FIG. 4 is a flow chart showing a processing sequence of the circuit shown in FIG. 1.
FIG. 5 shows an example of matrix image data read from high-quality paper.
FIG. 6 shows an example of matrix image data read from recycle paper.

FIGS. 5 and 6 show actual 3×3 pixel matrix patterns of high-quality paper and recycle paper. Note that numerical values in FIGS. 5 and 6 indicate the densities of pixel data. A pattern P1 in FIG. 5 represents a blank portion of the high-quality paper, and a pattern P2 in FIG. 6 is a pattern obtained when a blank portion of the recycle paper includes granular noise.

In the pattern P1, EG1=2 and EG2=−1 are obtained. In the pattern P2, EG1=20 and EG2=4 are obtained. Thus, read data of the recycle paper, i.e., data including granular noise is more edge-emphasized. Furthermore, when the patterns P1 and P2 are respectively edge-emphasized (an edge amount is multiplied with ½, and the product is added to the pixel of interest), EDD1=6 and EDD2=6 are obtained for the pattern P1. When the threshold value is set to be 30, both the data represent white data. In the case of the pattern P2, EDD1=31 and EDD2=25 are obtained. When the threshold value is similarly set to be 30, the data EDD1 represents black data and appears as noise although the data EDD2 represents white data. Since the selector 4 selects the image data EDD2 when the recycle paper mode is instructed, no noise is included in the image data.

The above-mentioned edge emphasis processor 3 and selector 4 serve as image processing means of the present invention.

<First Modification>

Figure 7:
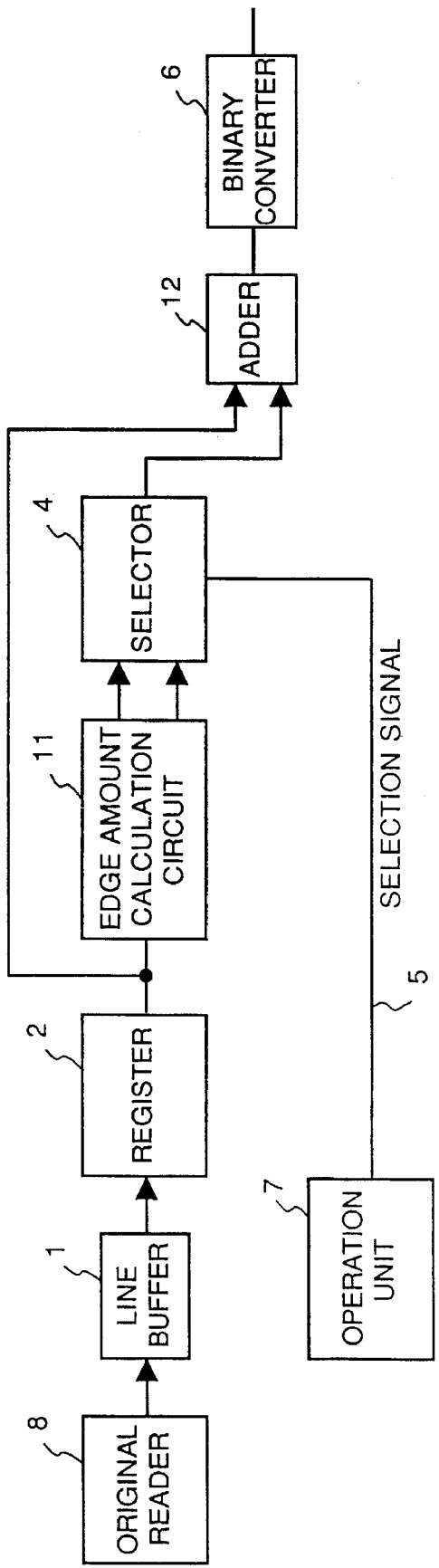
FIG. 7 is a block diagram showing a circuit arrangement according to the first modification of the first embodiment.
Figure 8:
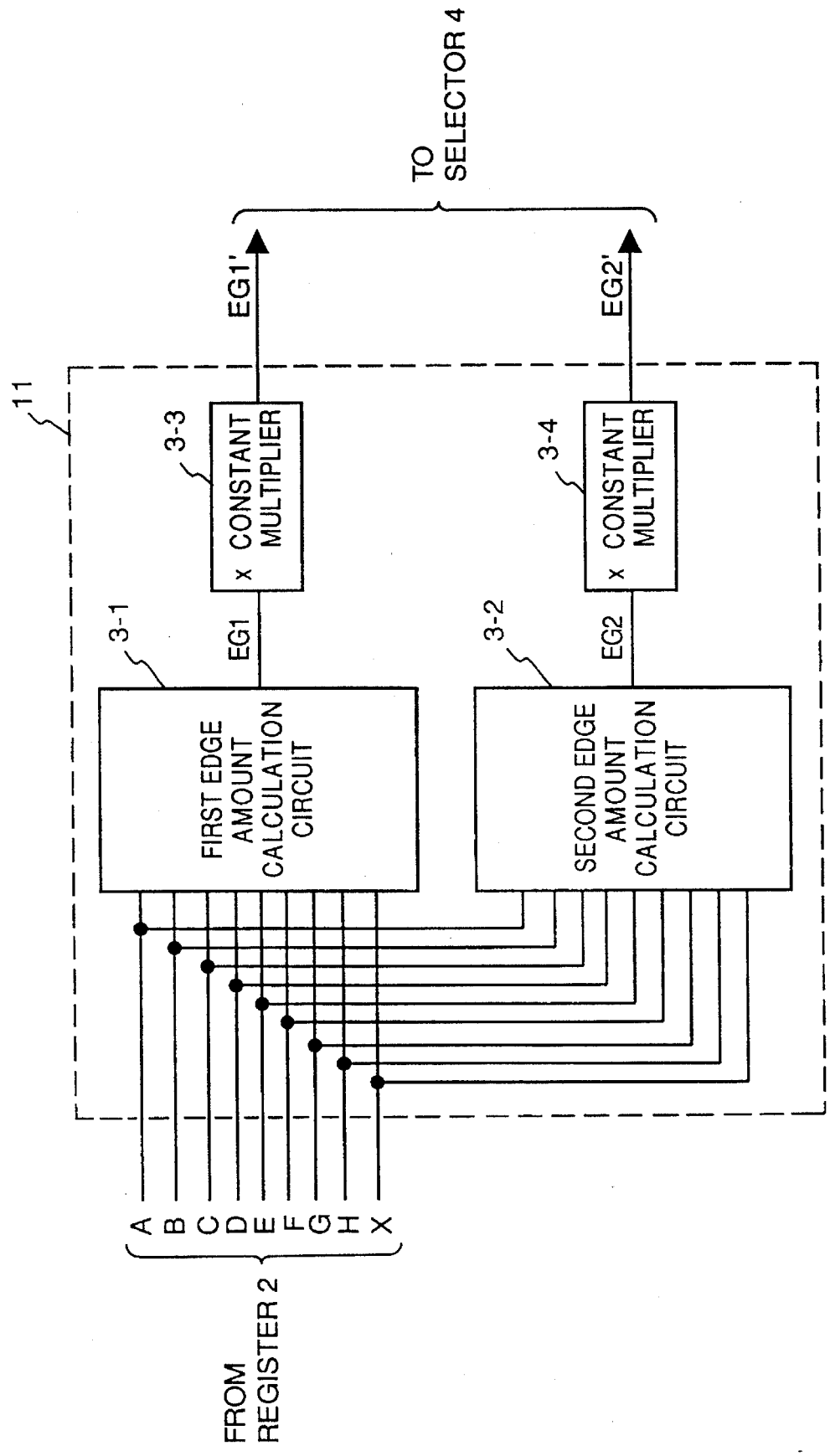
FIG. 8 is a block diagram showing a circuit arrangement of an edge amount calculation circuit 11 shown in FIG. 7.

In the first embodiment, the two adders 3-5 and 3-6 are arranged in the edge emphasis processor 3. As shown in FIG. 7, an edge amount calculation circuit 11 shown in detail in FIG. 8 may be arranged in place of the edge emphasis processor 3, and an adder 12 for executing addition processing corresponding to the adders 3-5 and 3-6 may be arranged at the output side of the selector 4.

Thus, one adder 12 need only be arranged, and the number of components can be decreased as compared to the first embodiment.

<Second Modification>

Figure 9:
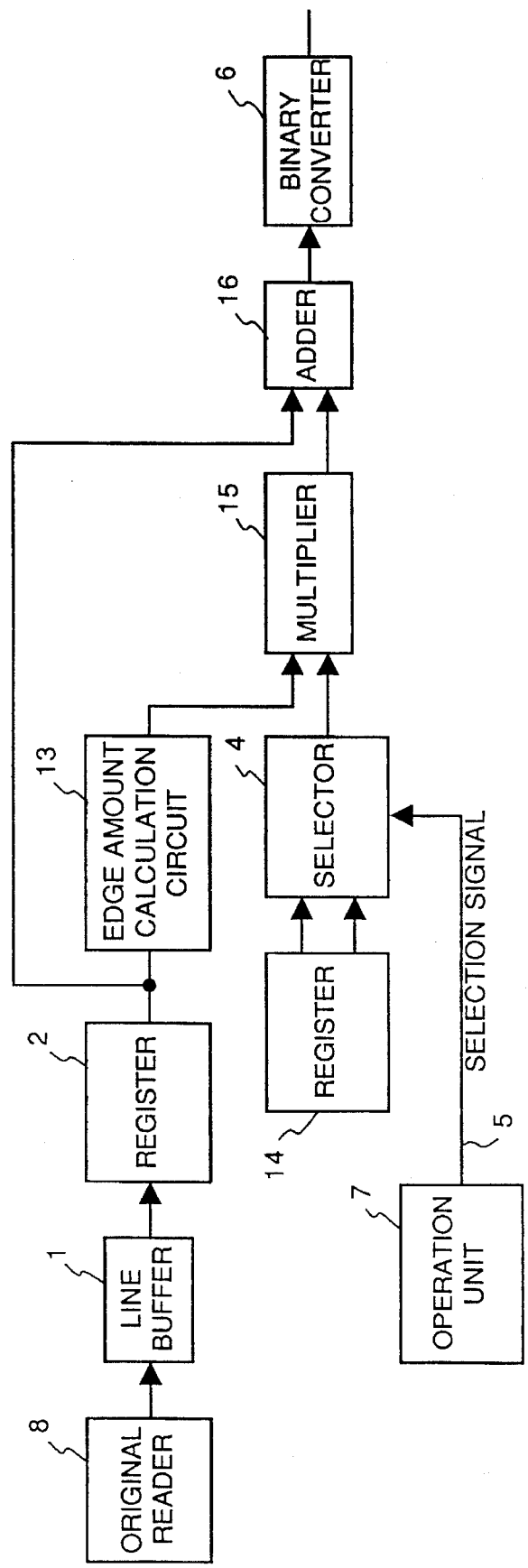
FIG. 9 is a block diagram showing a circuit arrangement according to the second modification of the first embodiment.

FIG. 9 shows a circuit arrangement for changing the degree of edge emphasis for image data according to the paper quality of a read original. The same reference numerals in FIG. 9 denote the same parts as in the first embodiment shown in FIG. 1, and a detailed description thereof will be omitted.

An edge amount calculation circuit 13 in this modification calculates an edge amount based on matrix image data according to the following formula (3):

$$EG=4X-(A+B+C+D) \qquad (3)$$

where X is the data of the pixel of interest, and A to H are the surrounding pixel data.

Figure 10:
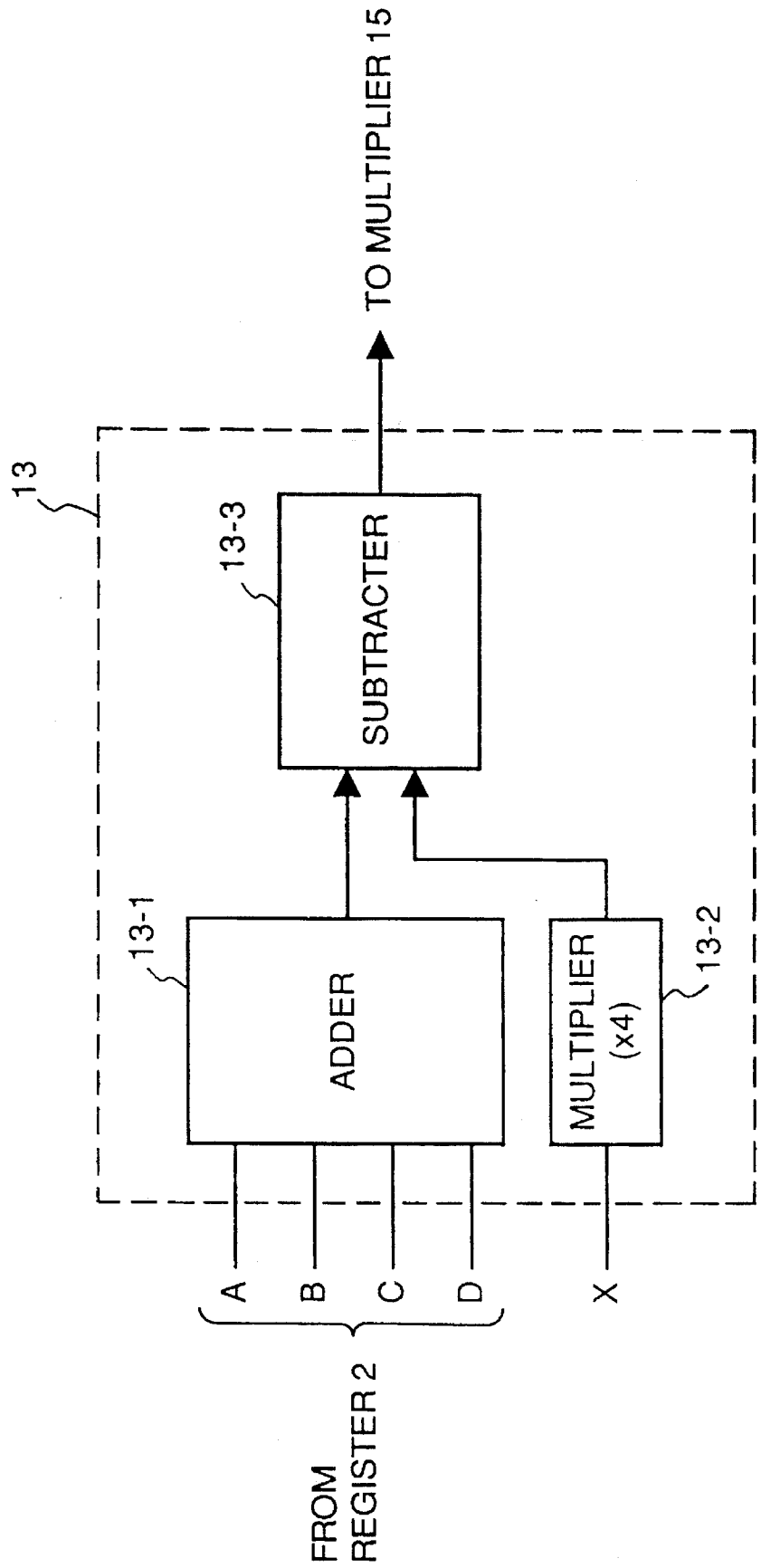
FIG. 10 is a block diagram showing a circuit arrangement of an edge amount calculation circuit 13 shown in FIG. 9.

FIG. 10 is a diagram showing a circuit arrangement for performing a calculation given by formula (3). As shown in FIG. 10, an adder 13-1 adds the surrounding pixel data A to D, a multiplier 13-2 multiplies the data of the pixel of interest with 4, and a subtracter 13-3 performs the above-mentioned subtraction.

A register 14 shown in FIG. 9 stores two different, i.e., large and small coefficient data. The large coefficient data is used in edge emphasis of data read from high-quality paper, and the small coefficient data is used in edge emphasis of data read from recycle paper.

The selector 4 selects and outputs one coefficient data to a multiplier 15 according to a paper quality mode instructed from the operation unit 7. The multiplier 15 multiplies the output value from the edge amount calculation circuit 13 with the selected coefficient value.

As a result, since the edge emphasis amount of image data read from recycle paper is lowered as compared to that from high-quality paper, the granular noise of a blank portion of a recycle paper original is not determined as a black portion in binary conversion processing, and does not appear as noise in binary image data.

The output result from the multiplier 15 is added to an output (pixel of interest) from the register 2 by an adder 16, and the sum is transferred to the binary converter 6.

Figure 11:
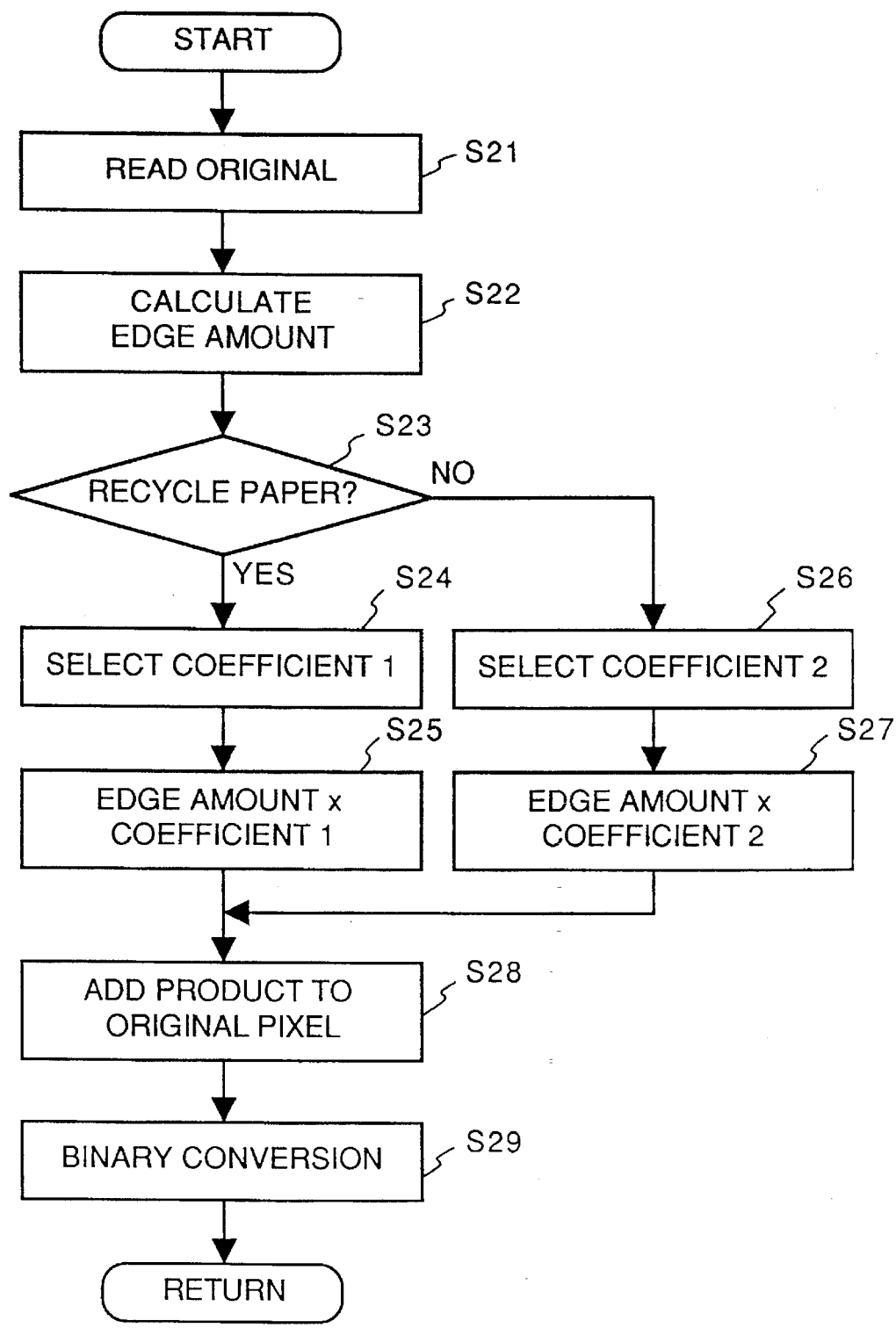
FIG. 11 is a flow chart showing a processing sequence of the circuit shown in FIG. 9.

FIG. 11 is a flow chart showing the above-mentioned processing sequence. In step S21, the original reader 8 reads an original, and the line buffer 1 and the register 2 generate 3×3 matrix image data. In step S22, the above-mentioned edge amount calculation circuit 13 calculates an edge amount. It is then checked in step S23 if the paper quality mode instructed by the operation unit 7 is the recycle paper mode. If YES in step S23, the flow advances to step S24, and the selector 4 selects a small coefficient 1 in the register 14. In step S25, the edge amount is multiplied with the selected coefficient. However, if the high-quality paper mode is selected, the flow advances to step S26, and a coefficient 2 is selected. In step S27, the edge amount is multiplied with the selected coefficient. In step S28, the product is added to the original pixel, and in step S29, binary conversion processing is performed.

<Third Modification>

Figure 12:
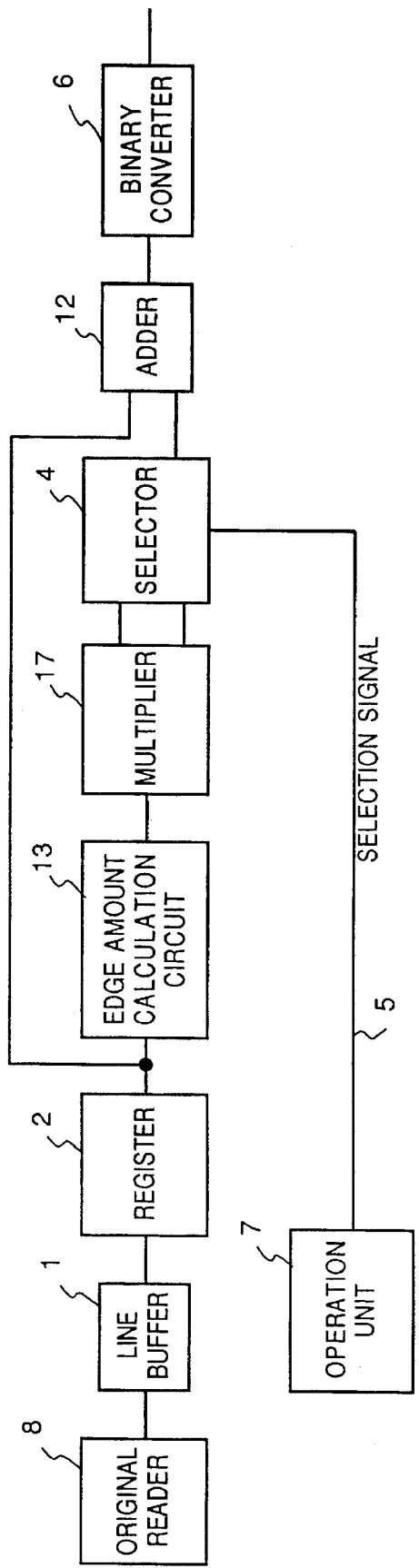
FIG. 12 is a block diagram showing a circuit arrangement according to the third modification of the first embodiment.
Figure 13:
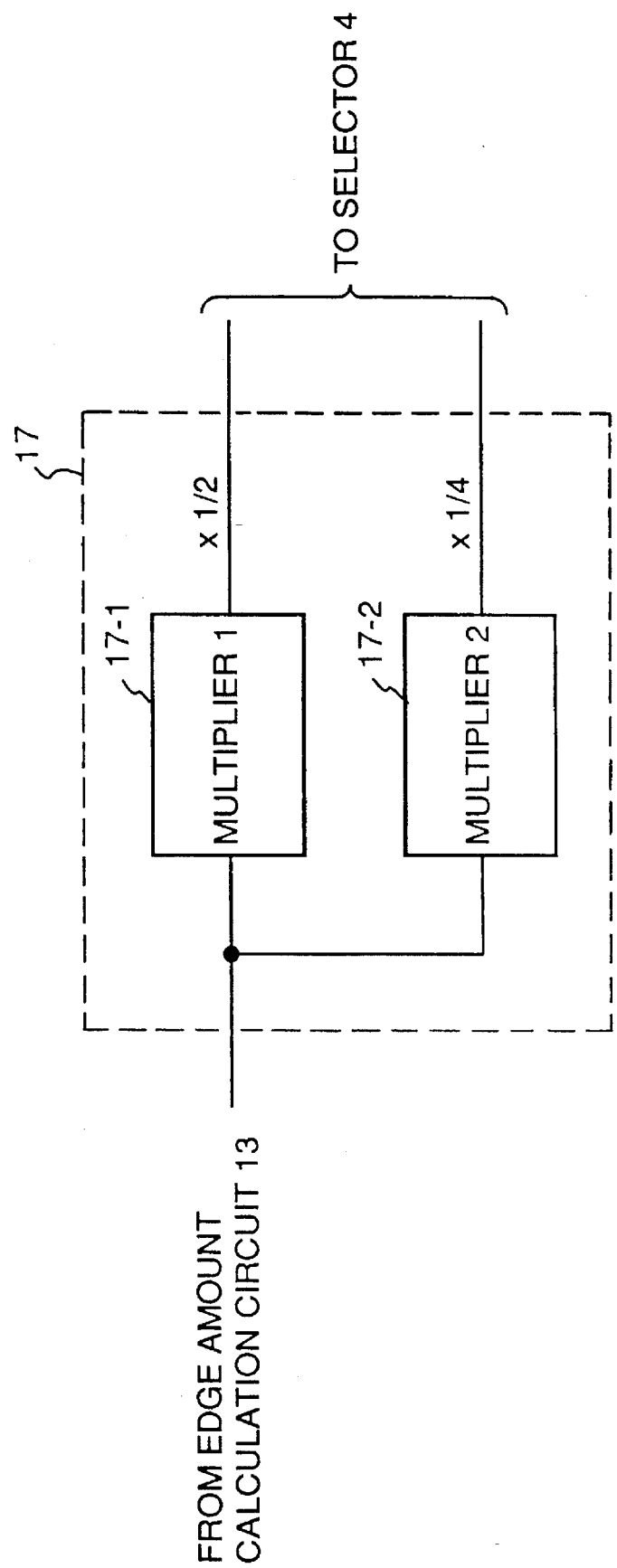
FIG. 13 is a block diagram showing a circuit arrangement of a multiplier 17 shown in FIG. 12.

In the second modification, the two different coefficient data are stored in the register 14. As shown in FIG. 12, a multiplier 17 shown in detail in FIG. 13 may be used in place of the register 14. In this modification, the degree of edge emphasis is changed by two multipliers 17-1 and 17-2.

Thus, the edge amount calculation circuit 13 generates values obtained multiplying the edge amount ED calculated by formula (3) with two different coefficient values, and the selector 4 selects one of the two values in correspondence with the paper quality mode.

<Fourth Modification>

In the first embodiment and the first to third modifications, different edge emphasis operations are executed according to the instructed paper quality mode. The arrangement may be modified to execute edge emphasis in the high-quality paper mode and to inhibit edge emphasis in the recycle paper mode.

Figure 14:
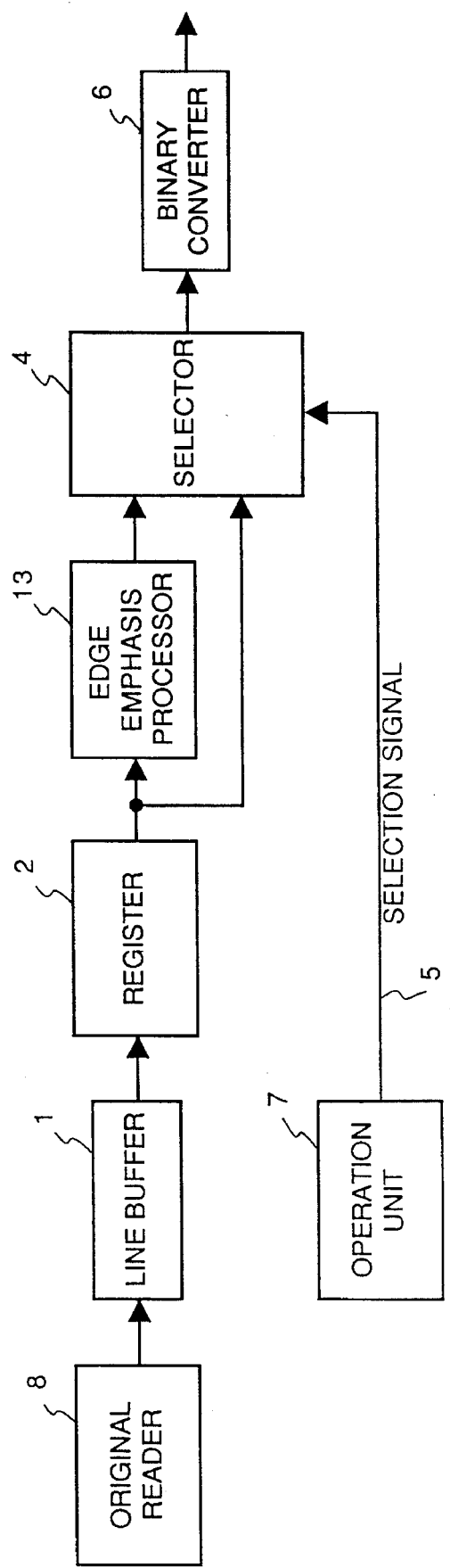
FIG. 14 is a block diagram showing a circuit arrangement according to the fourth modification of the first embodiment.

FIG. 14 is a block diagram showing a circuit arrangement of this modification. The same reference numerals in FIG. 14 denote the same parts as in the above embodiment and modifications, and a detailed description thereof will be omitted. FIG. 15 is a flow chart showing a processing sequence of this modification. In step S31, an original is read. In step S32, it is checked if the recycle paper mode is instructed. If it is determined in step S32 that the recycle paper mode is instructed, the flow advances to step S34; if it is determined that the high-quality paper mode is selected, the flow advances to step S33. In step S33, the edge emphasis calculation circuit 13 calculates an edge amount, and in step S34, the edge-emphasized image data is binary-converted.

<Fifth Modification>

In the above-mentioned fourth modification, edge emphasis is inhibited in the recycle paper mode. In the fifth modification, even when the recycle paper mode is selected, if the sign of the calculated edge amount is negative, edge emphasis is executed.

Figure 16:
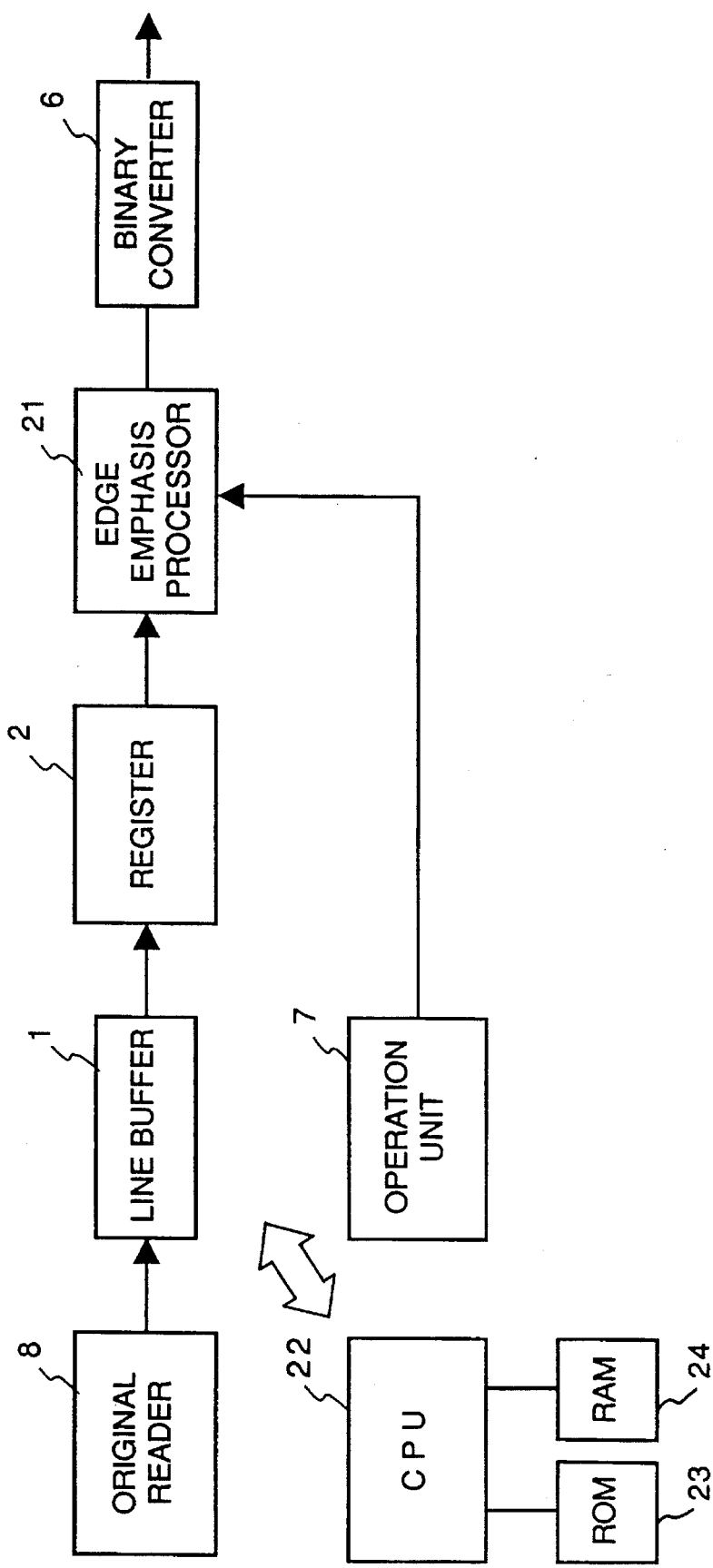
FIG. 16 is a block diagram showing a circuit arrangement according to the fifth modification of the first embodiment.

FIG. 16 is a block diagram showing an arrangement of this modification. The same reference numerals in FIG. 16 denote the same parts as in the above-mentioned embodiment, and a detailed description thereof will be omitted. Reference numeral 21 denotes an edge emphasis processor for performing edge emphasis processing of a pixel of interest in this modification; 22, a CPU for controlling the overall apparatus; 23, a ROM for storing a processing sequence (program), and the like of the CPU 22; and 24, a RAM used as a work area for various programs.

Note that the operation unit 7 comprises a key for designating a mode corresponding to recycle paper according to the first embodiment, i.e., the recycle paper mode.

Figure 17:
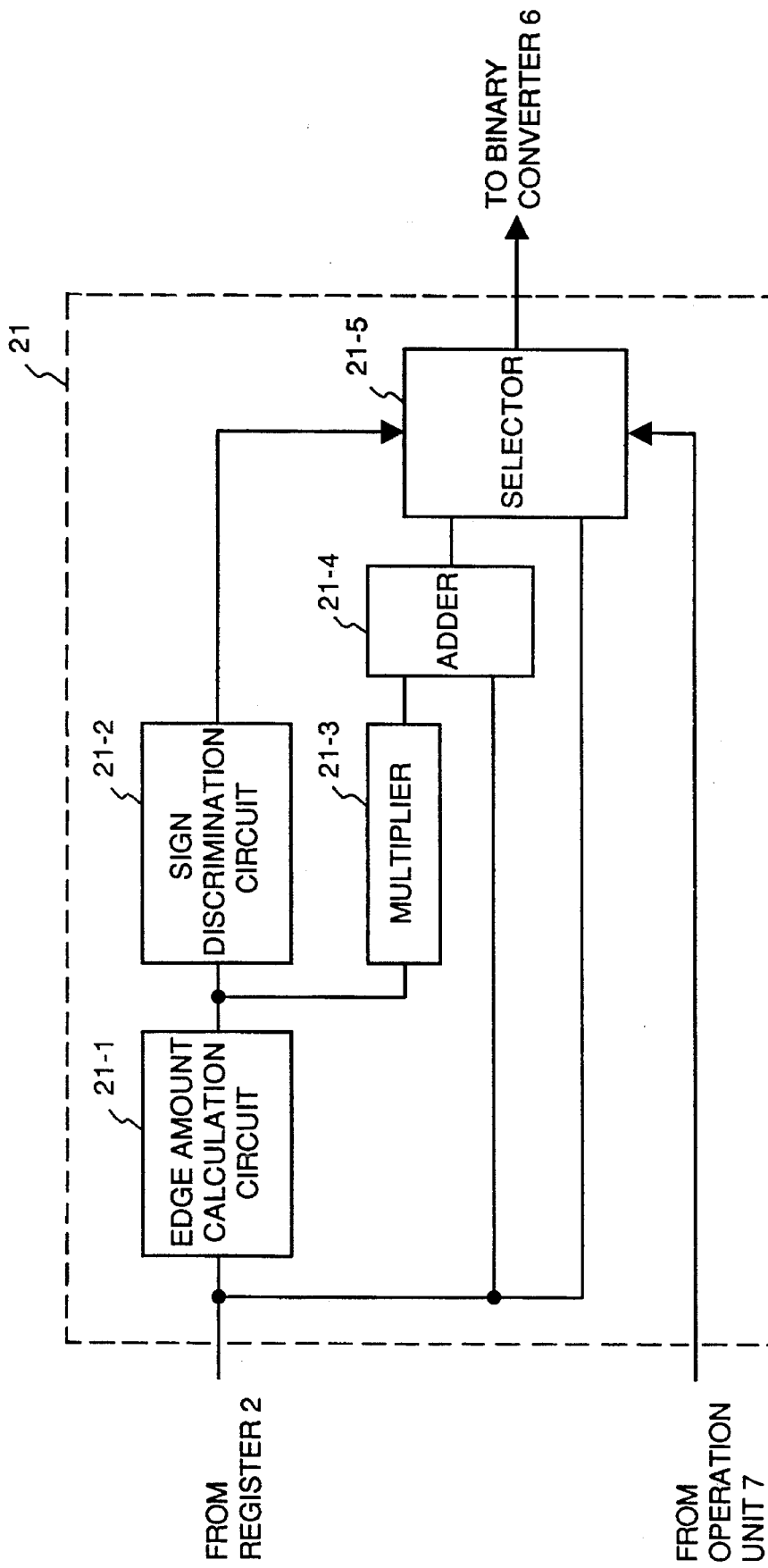
FIG. 17 is a block diagram showing a circuit arrangement of an edge emphasis processor shown in FIG. 16.

FIG. 17 is a block diagram showing an internal arrangement of the above-mentioned edge emphasis processor 21. In FIG. 17, reference numeral 21-1 denotes a calculation circuit for calculating an edge amount of a pixel of interest; 21-2, an edge amount sign discrimination circuit; 21-3, a multiplier for multiplying the edge amount with a constant; 21-4, an adder for adding the output from the calculation circuit 21-1 to the value of the pixel of interest; and 21-5, a selector for selecting and outputting one of edge-emphasized image data or non-edge-emphasized image data according to the output from the discrimination circuit 21-2 and a control signal from the operation unit 7.

In the above-mentioned arrangement, for example, when the recycle paper pattern P2 shown in FIG. 6 is edge-emphasized, i.e., when the edge amount EG is multiplied with ½ (i.e., a coefficient=½), and the product is added to the pixel of interest (density value=15), the value of the pixel of interest is calculated as follows according to the edge amount EG calculation formula (3):

$$15+EG/2=15+(4\times15-(7+7+7+7))/2=31$$

When this data is binary-converted to have the threshold value="30", since 31>30, this data is determined as black data, and appears as noise. On the other hand, when the "recycle paper mode" is selected by the operation unit 7, the selector 21-5 is set to output non-edge-emphasized data if the edge amount EG is positive, and to output edge-emphasized data if the edge amount EG is negative. Thus, even when the pattern shown in FIG. 6 is binary-converted, the converted data represents white data, and does not appear as noise.

Figure 18:
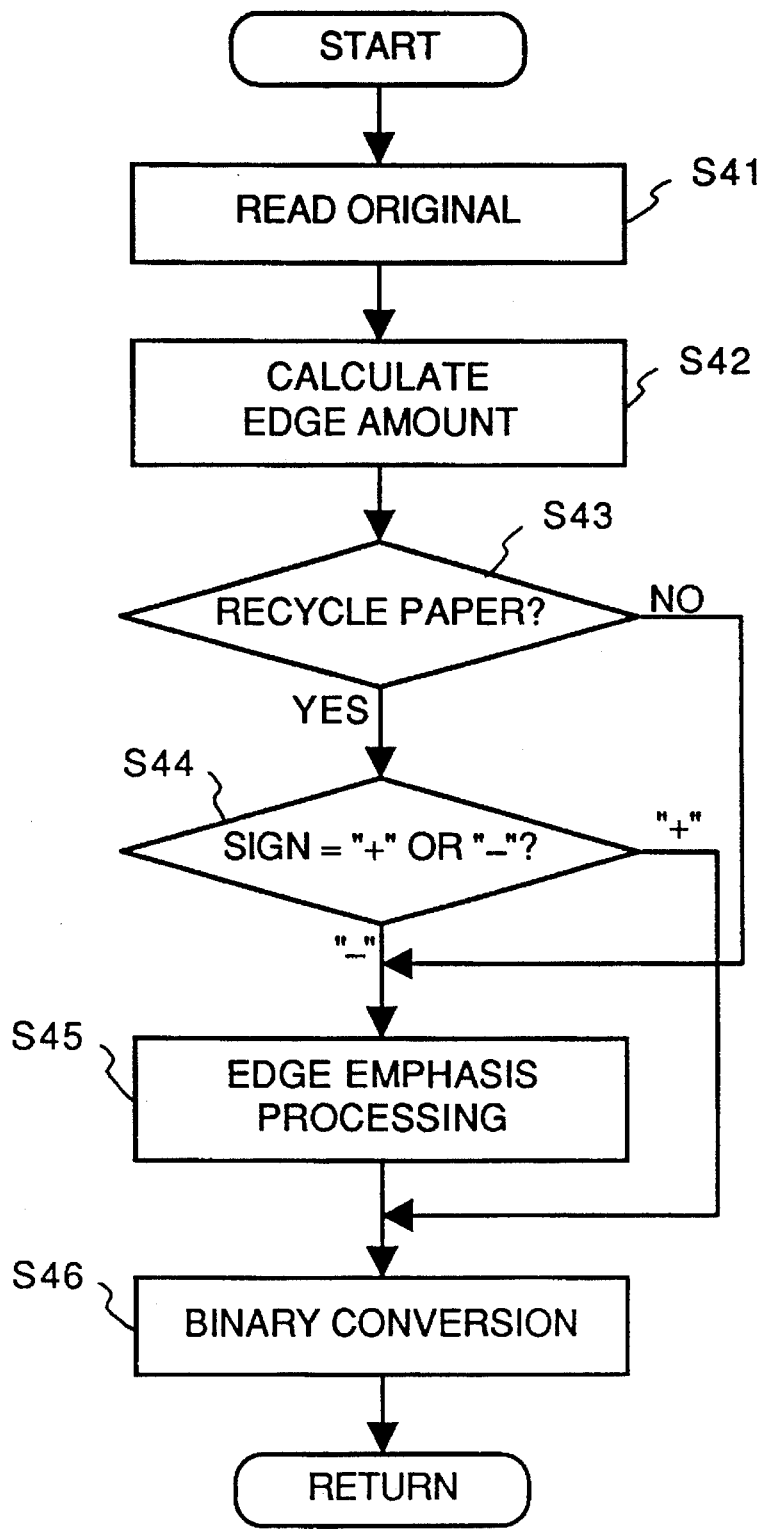
FIG. 18 is a flow chart showing a processing sequence of the circuit shown in FIG. 16.

FIG. 18 is a flow chart showing the above-mentioned processing sequence. The processing sequence to be described below is controlled by the CPU 22, and processing operations are respectively executed by the circuits shown in FIG. 16.

In steps S41 and S42, image data read by the original reader 8 is input to the edge amount calculation circuit 21-1, and an edge amount is calculated. If the operation unit 7 instructs that the original is high-quality paper in step S43, no sign discrimination is performed, and in step S45, the image data is emphasized by adding the edge amount to the pixel of interest.

On the other hand, if the operation unit 7 instructs that the original is recycle paper in step S43, it is checked by the sign discrimination circuit 21-2 in step S44 if the edge amount is positive or negative. If it is determined in step S44 that the edge amount is negative, the image data is edge-emphasized by adding the edge amount to the pixel of interest in step S45 like in the case of the high-quality paper original. However, if it is determined in step S44 that the edge amount is positive, the edge amount is not added, and the data of the pixel of interest is output without modifications. In step S46, the output data is binary-converted by the binary converter 6.

As described above, according to this modification, when a read original is recycle paper, the degree of edge emphasis is changed according to the sign of a correction amount for edge emphasis. Thus, a sharp image free from noise can be obtained in the case of the recycle paper original.

<Sixth Modification>

FIG. 19 is a block diagram showing an internal arrangement of an edge emphasis processor 25 according to this modification. The same reference numerals in FIG. 19 denote the same parts as in FIG. 17.

In the edge emphasis processor 25, reference numeral 21-6 denotes a second multiplier for multiplying the edge amount of a pixel of interest with a coefficient different from that of the multiplier 21-3.

When the edge amount EG of the pattern shown in FIG. 6 is multiplied with ¼, and the product is added to the pixel of interest, the value of the pixel of interest after edge emphasis is:

$$15+EG/4=15+(4\times15-(7+7+7+7))/4=23$$

When binary conversion processing is performed to have the threshold value="30", since 23<30, this data is determined as white data, and no noise appears.

When the "recycle paper mode" key is depressed at the operation unit 7, the selector 21-5 selects and outputs data multiplied with a smaller coefficient from one of the multipliers 21-3 and 21-6 if the edge amount is positive; it selects and outputs data multiplied with a larger coefficient if the edge amount is negative. Thus, the background portion of the recycle paper can be suppressed from being converted to point dots in binary conversion. Even when a recycle paper original is read, generation of noise can be suppressed.

In the above-mentioned first embodiment, the number of types of paper quality of a read original is two. However, the present invention is not limited to the two types, and the degree of edge emphasis may be varied depending on the type of paper quality.

As described above, according to the first embodiment, since emphasis of the noise component can be suppressed according to paper quality of a read original, image quality can be improved as compared to the prior art.

<Second Embodiment>

The second embodiment of the present invention will be described in detail below with reference to the accompanying drawings.

Figure 21:
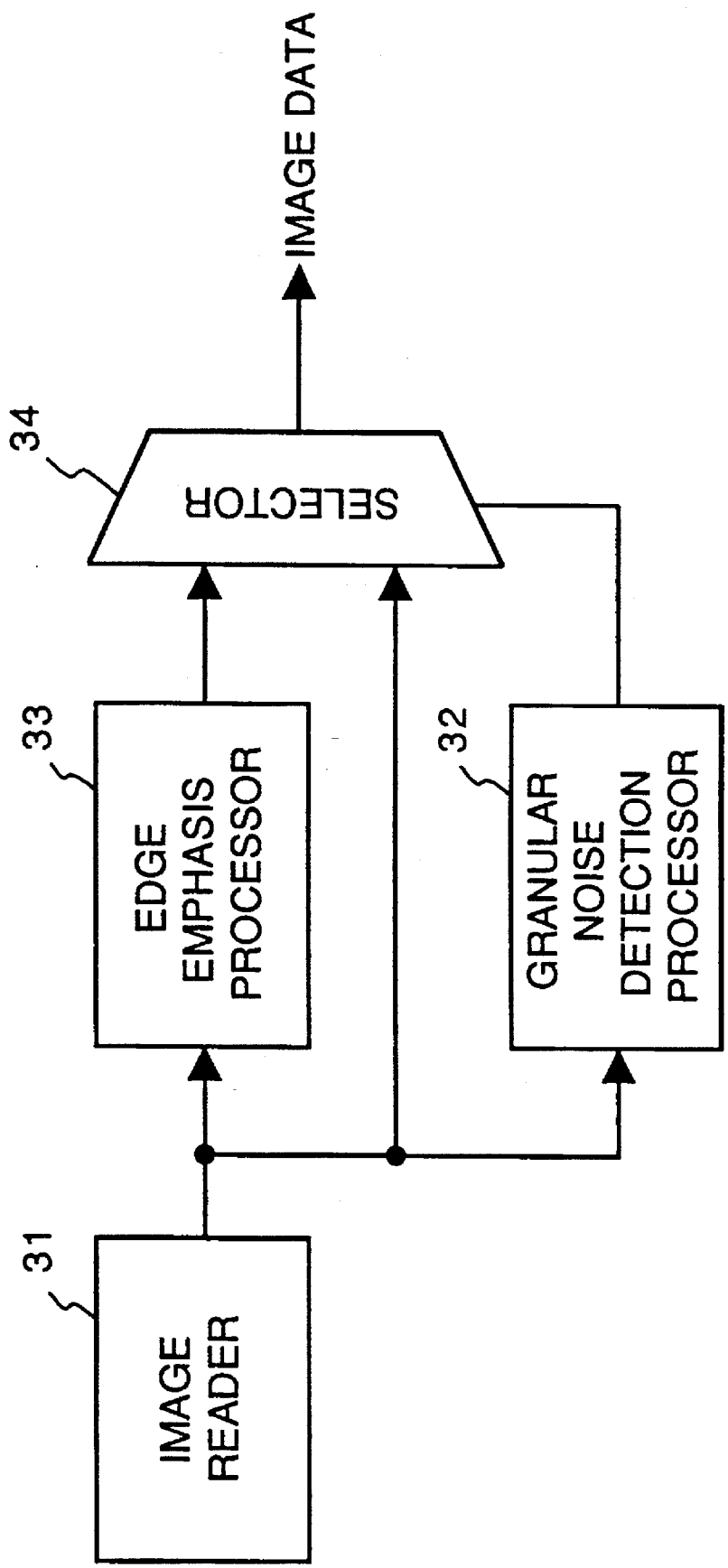
FIG. 21 is a block diagram showing a basic arrangement according to the second embodiment of the present invention.

FIG. 21 is a block diagram showing a basic arrangement of the second embodiment.

An image reader 31 has a function of A/D converting read analog data into multi-value digital data after shading correction processing and the like.

A granular noise detection processor 32 discriminates based on pixel data read by the image reader 31 whether or not a pixel of interest corresponds to granular noise.

An edge emphasis processor 33 performs edge emphasis processing of image data read by the image reader 31.

When it is determined according to the granular noise detection processing result that the pixel of interest corresponds to granular noise, a selector 34 selects the output from the image reader 31 as image data; otherwise, it selects the output from the edge emphasis processor 33.

The processing operations of the respective units will be described in detail below.

Figure 22:
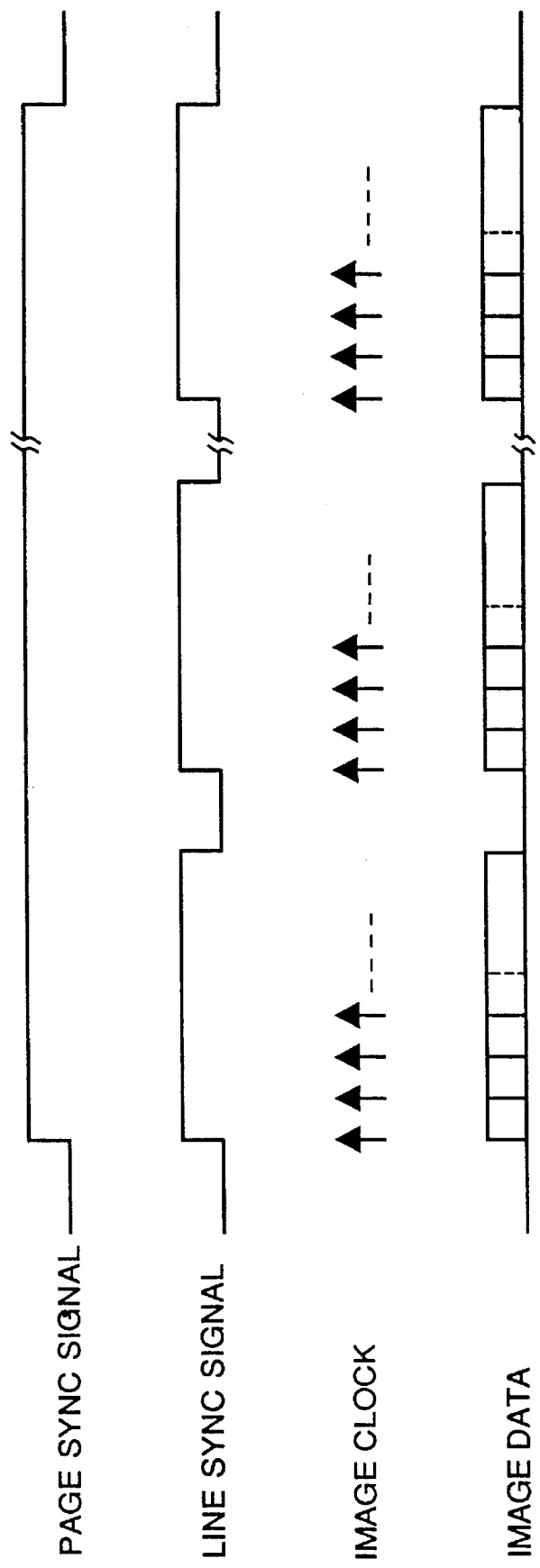
FIG. 22 is a timing chart showing the timings of an image signal shown in FIG. 21.

FIG. 22 is a timing chart showing timings of an image signal.

Image data read by the image reader 31 is input as follows. That is, one pixel data is input in synchronism with an image clock, image data for one line is input in synchronism with a line sync signal, and image data for one page is input in synchronism with a page sync signal.

Figure 23:
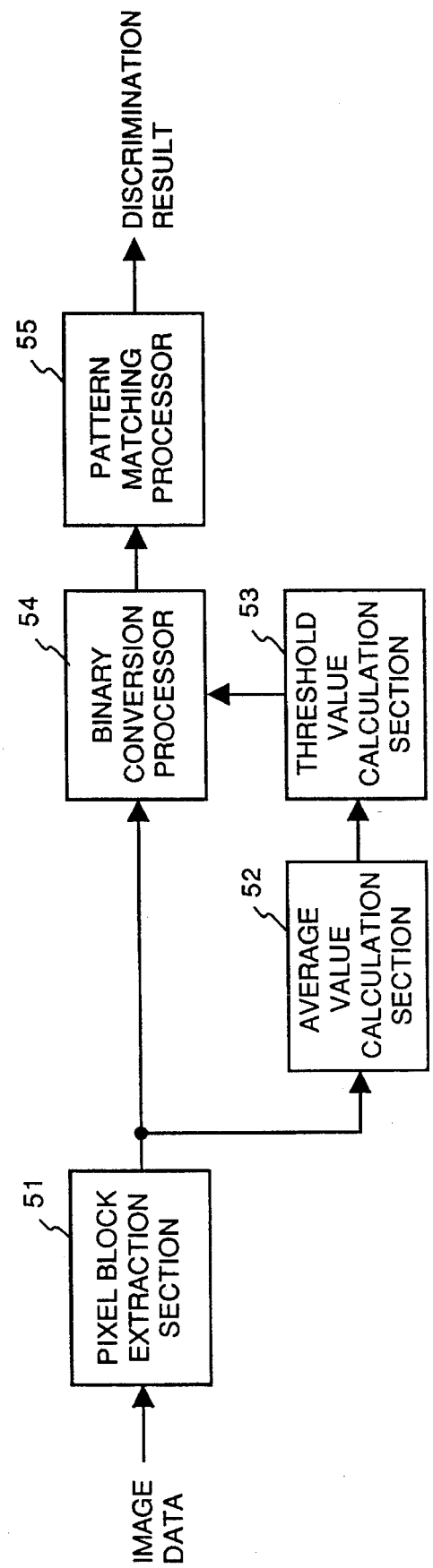
FIG. 23 is a block diagram showing an arrangement of a granular noise detection processor 32 shown in FIG. 21.

FIG. 23 is a block diagram showing an arrangement of the granular noise detection processor 32.

Figure 25:
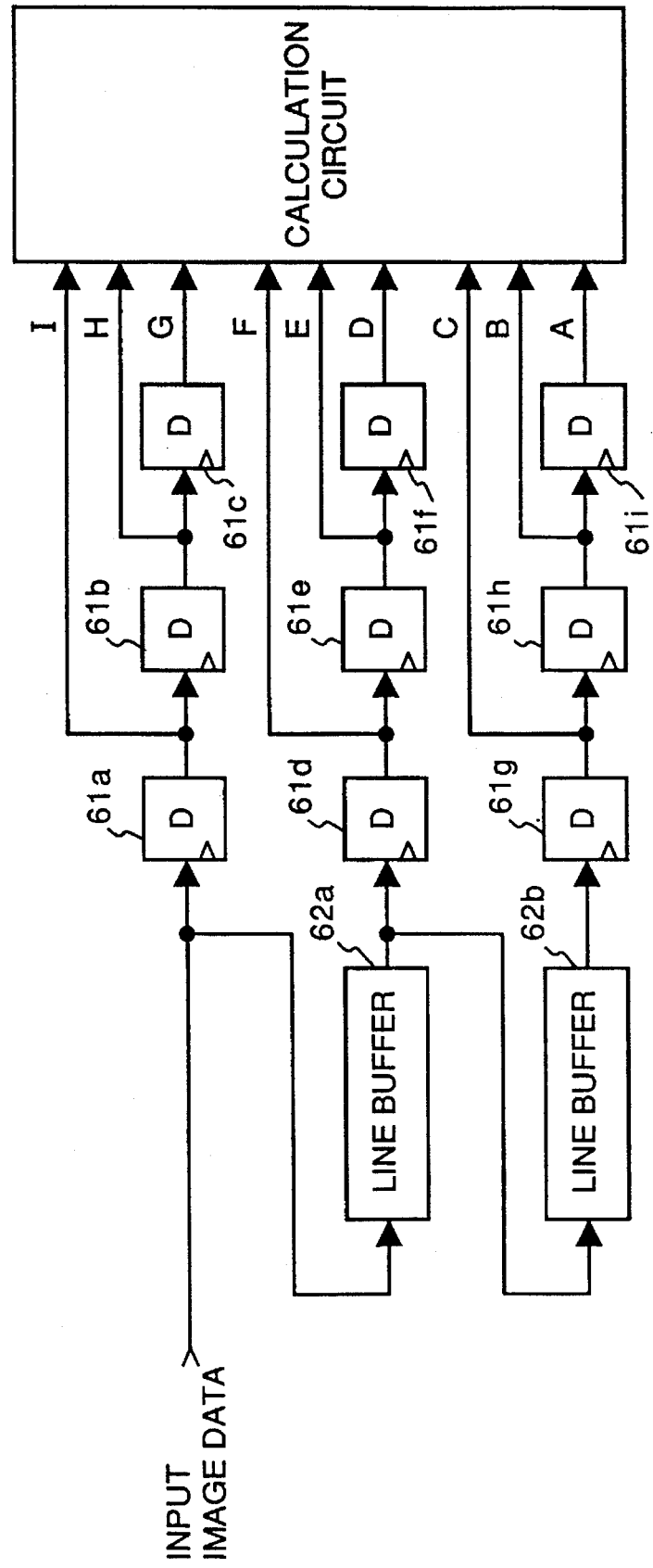
FIG. 25 is a block diagram showing an arrangement of a pixel block extraction section 51 shown in FIG. 23.
Figure 26:
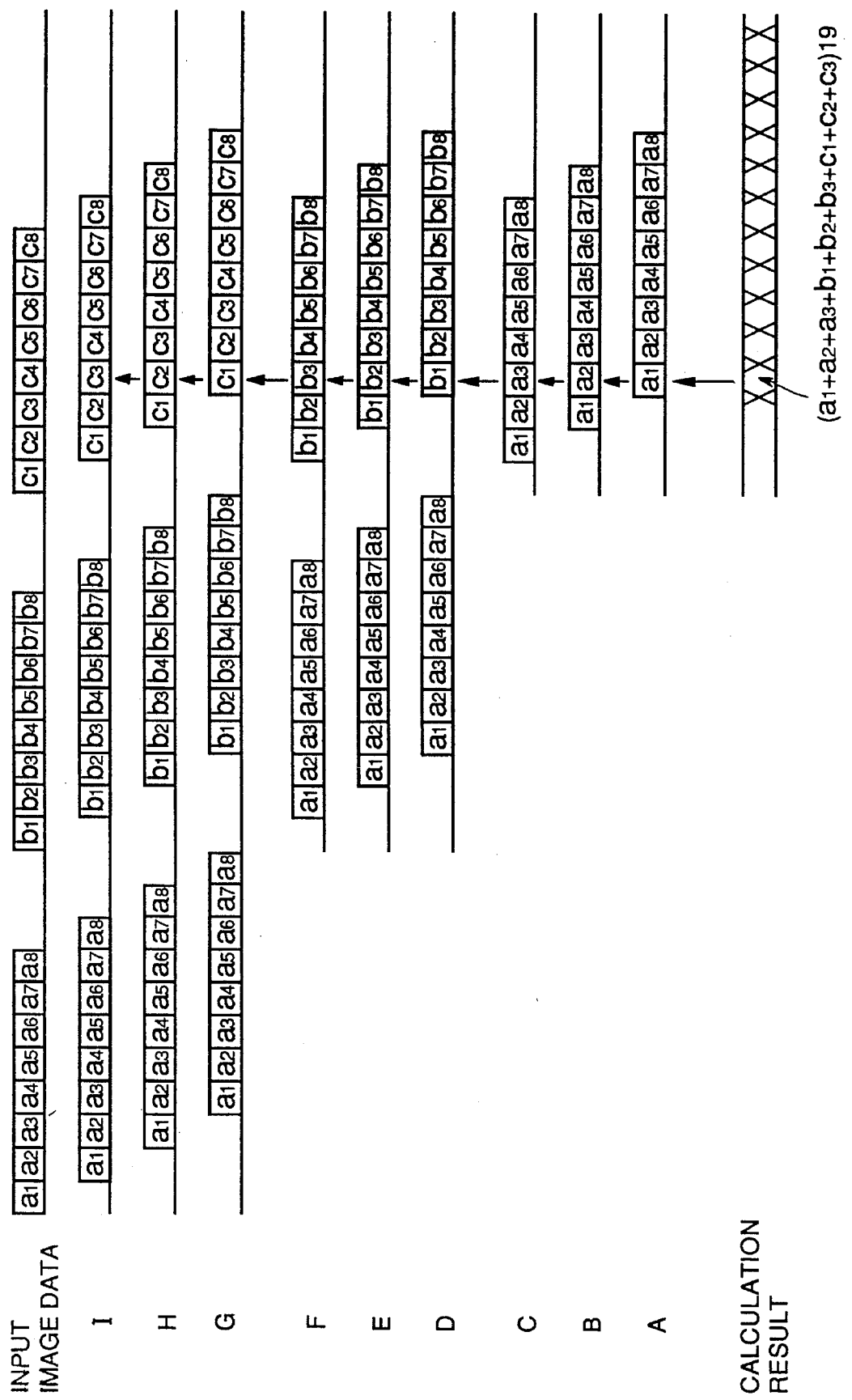
FIG. 26 is a timing chart showing the timings of the circuit shown in FIG. 25.

A pixel block extraction section 51 extracts reference pixels for detecting granular noise. More specifically, if reference pixels are 3×3 pixels, as shown in FIG. 24, the section 51 is realized by the arrangement, as shown in FIG. 25. In FIG. 25, each of D-flip-flops 61a to 61i constitutes a one-pixel delay element, and each of line buffers 62a and 62b constitutes a one-line delay element. FIG. 26 is a timing chart showing the timings of the pixel block extraction section 51. Signals shown in FIG. 26 correspond to pixels A to I shown in FIG. 24. In this case, the number of pixels in the main scan direction is "8". When input image data is passed through the delay elements, as shown in FIG. 26, a plurality of required pixels can be referred to at the same timing.

An average value calculation section 52 calculates an average density of a reference block using the extracted reference pixel values. More specifically, the section 52 performs the following calculation.

$$I_{AV}=(I_A+I_B+I_C+I_D+I_E+I_F+I_G+I_H+I_I)/9$$

where $I_{AV}$ is the average density, and $I_N$ is the density of a pixel N.

A threshold value calculation section 53 calculates a threshold value for binary-converting image data in the pixel block using the average density calculated by the average value calculation section 52. More specifically, the section 53 calculates a threshold value TH by the following calculation:

$$TH=I_{AV}+\alpha$$

where $\alpha$ is the correction value ($<<I_{AV}$). The detection level is controlled in accordance with the correction value $\alpha$.

A binary conversion processor 54 binary-converts pixels in the block using the threshold value calculated by the threshold value calculation section 53. In this manner, since binary conversion processing is performed using the average value in the block, a binary image whose high-frequency component is emphasized can be obtained.

More specifically, granular noise detection as an object is allowed. For example, when reference pixels in a block have values shown in FIG. 27 (each pixel value assumes a value ranging between 0 and 64), if binary conversion processing is performed using a normal threshold value (TH=32), a pixel of interest is determined as a white pixel, and no granular noise is detected. However, when binary conversion processing is performed using the average density in the block, the threshold value is TH=4 (when $\alpha=0$), and the pixel of interest is determined as a black pixel. Thus, a pattern matching processor 55 (to be described below) can detect granular noise.

The pattern matching processor 55 detects a granular noise pattern from an image pattern in the block binary-converted by the binary conversion processor 54 by template matching. More specifically, the processor 55 determines patterns shown in FIG. 28 as granular noise patterns. The pattern matching processor 55 can be easily realized by a pixel block extraction section 91 and a ROM (read-only memory) 92, as shown in FIG. 29. In the ROM 92, a reference pixel is used as an address (in this case, 9 bits), and a discrimination result is pre-programmed as a memory content corresponding to the address. When the ROM data output is sampled in synchronism with the image clock described above, a pattern matching result can be obtained.

The edge emphasis processor 33 (FIG. 21) is constituted by a pixel block extraction section 71 for extracting reference pixels, an edge amount calculation section 72 for calculating an edge amount of a pixel of interest from the reference pixels, and an adder 73 for adding the edge amount to the data of the pixel of interest, as shown in FIG. 30. More specifically, for example, when output data from a signal line E shown in FIG. 24 is used as a pixel of interest, and a calculation is made using a Laplacian filter having coefficients shown in FIG. 20, the edge amount is calculated by:

$$E_E=\{4\times I_E-(I_B+I_D+I_F+I_H)\}/4$$

$E_E$ is multiplied with a proper coefficient, and the product is added to the value of the pixel of interest, thereby obtaining edge-emphasized image data.

The selector 34 (FIG. 21) is an image data selector. When granular noise is detected, the selector 34 outputs read image data as an output image; otherwise, it outputs edge-emphasized image data as an output image. Note that the output image data is encoded after binary conversion processing, and the encoded data is stored in a memory in the case of, e.g., a facsimile machine.

Figure 31:
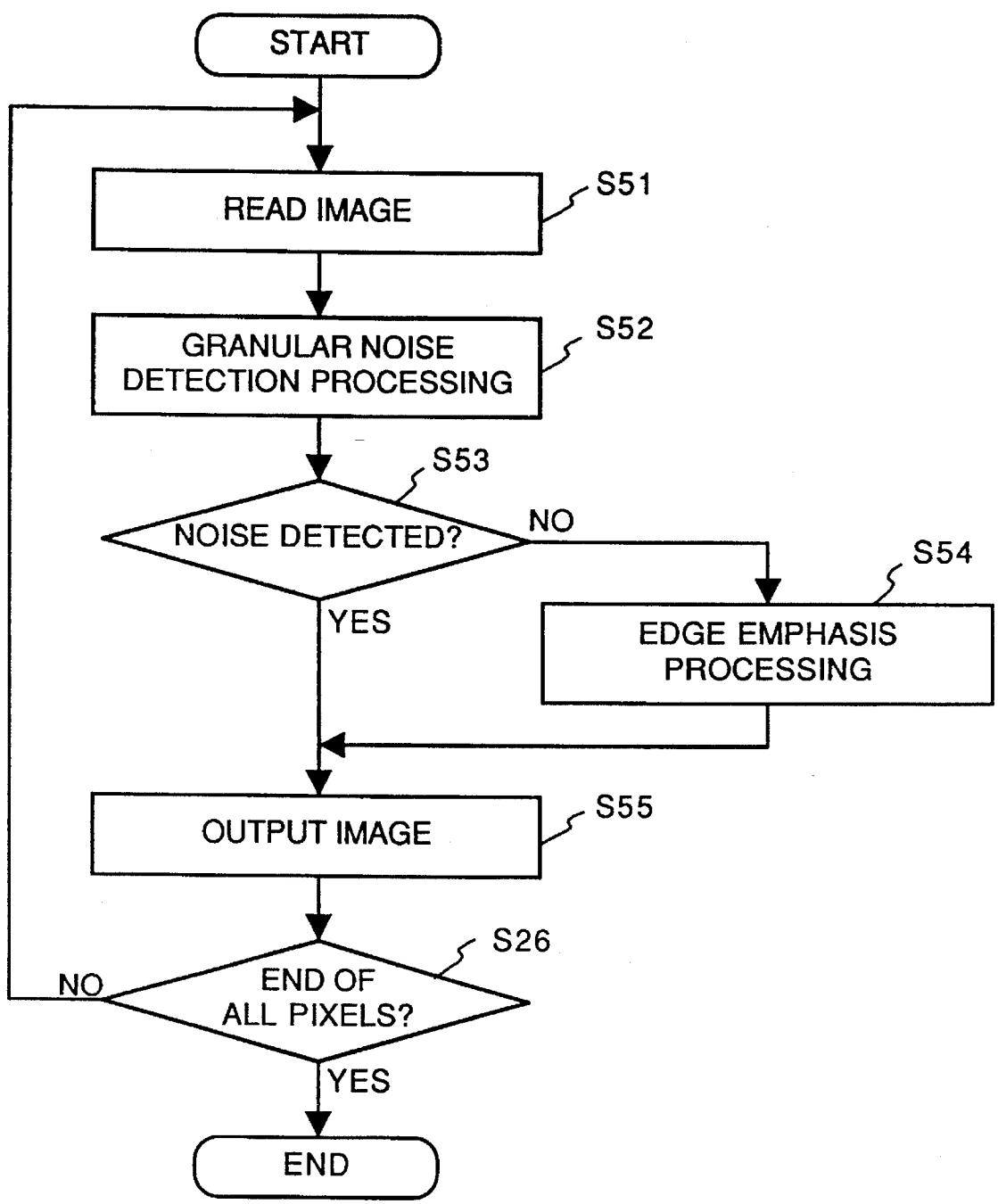
FIG. 31 is a flow chart showing a processing sequence of the second embodiment.

The processing sequence of the second embodiment will be described below with reference to the flow chart shown in FIG. 31.

A binary image pattern in a block is extracted from image data read by the image reader 31 in step S51 by granular noise detection processing (step S52). When the image pattern coincides with a predetermined granular noise pattern (step S53), the read image is output without modifications (step S55); when no noise is detected, the read image data is subjected to edge emphasis processing (step S54). Thereafter, the edge-emphasized image data is output (step S55). The above-mentioned processing is repetitively performed for all the pixels (step S56).

In this manner, according to the second embodiment, only a required image can be edge-emphasized by simple pattern matching processing, and granular noise generated when a recycle paper original is read can be reduced without influencing the resolution of an image.

In the above embodiment, a reference block for detecting granular noise is a 3×3 pixel block. However, the present invention is not limited to this, and windows having any other sizes may be used. The discrimination patterns are not limited to those presented in this embodiment, and various other patterns may be used.

Pattern matching need not always be realized by matching with a granular noise pattern. Contrary to this, an edge pattern may be detected, and a portion other than the edge portion may be determined as noise. In this case, the pattern shown in, e.g., FIG. 30 is detected, and a pattern other than this pattern is processed as a noise detection block.

Furthermore, granular noise detection processing may be realized by directly detecting granular noise based on the density gradient of multi-value pixel data in a block in place of discrimination using the binary patterns of the above embodiment. For example, in the case of the reference pixels shown in, e.g., FIG. 24, detection may be made using the following discrimination formula:

$$D = SIG\,(I_E - I_A) \times SIG\,(I_E - I_B) \times SIG\,(I_E - I_C) \times$$
$$SIG\,(I_E - I_H) \times SIG\,(I_E - I_F) \times SIG\,(I_E - I_G) \times$$
$$SIG\,(I_E - I_H) \times SIG\,(I_E - I_I)$$

where $SIG(X)=1$ when $S \geq 0$; $SIG(X)=0$ when $X<0$, and $I_N$ is the density of a pixel N.

When D=1 is obtained from the above $I_A$ discrimination formula, a noise image is determined. More specifically, when the pixel of interest has an extreme value, it is determined as granular noise.

Such changes may also be made in the following modifications.

<First Modification>

Figure 33:
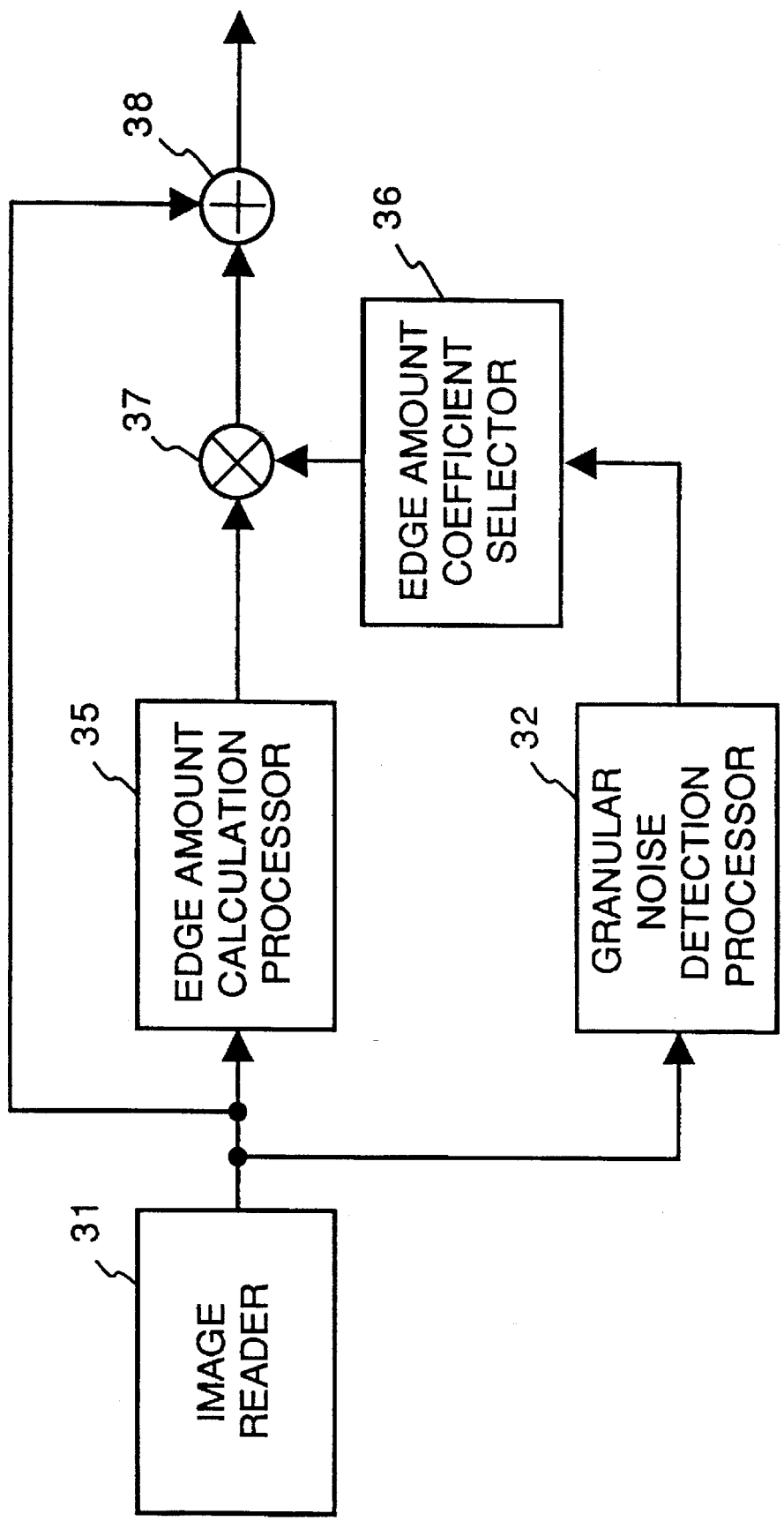
FIG. 33 is a block diagram showing an arrangement according to the first modification of the second embodiment.

FIG. 33 is a block diagram showing a basic arrangement according to the first modification of the second embodiment. The image reader 31 and the granular noise detection processor 32 have the same arrangements as those in the second embodiment, and a detailed description thereof will be omitted.

An edge amount calculation processor 35 calculates an edge amount of image data read by the image reader 31. The edge amount calculation processor 35 has substantially the same arrangement as that of the edge emphasis processor 33 of the second embodiment shown in FIG. 30, except that the adder 73 is excluded, as shown in FIG. 34. The processor 35 calculates the edge amount of the pixel of interest from the reference pixels by the same processing as that of the above-mentioned edge emphasis processor 33.

An edge amount coefficient selector 36 selects one of a plurality of coefficients on the basis of the above-mentioned granular noise detection processing result. More specifically, two different coefficients $k_1$ and $k_2$ are prepared. When granular noise is detected, the selector 36 selects the coefficient $k_1$; otherwise, it selects the coefficient $k_2$. If $k_1 < k_2$ (e.g., $k_1=1$, $k_2=4$) is set, the edge emphasis effect for a pixel determined as granular noise is weakened.

A multiplier 37 multiplies the edge amount calculated by the edge amount calculation processor 35 with the coefficient selected by the edge amount coefficient selector 36.

An adder 38 adds the edge amount multiplied with the coefficient by the multiplier 37 to the image data read by the image reader 31.

Figure 35:
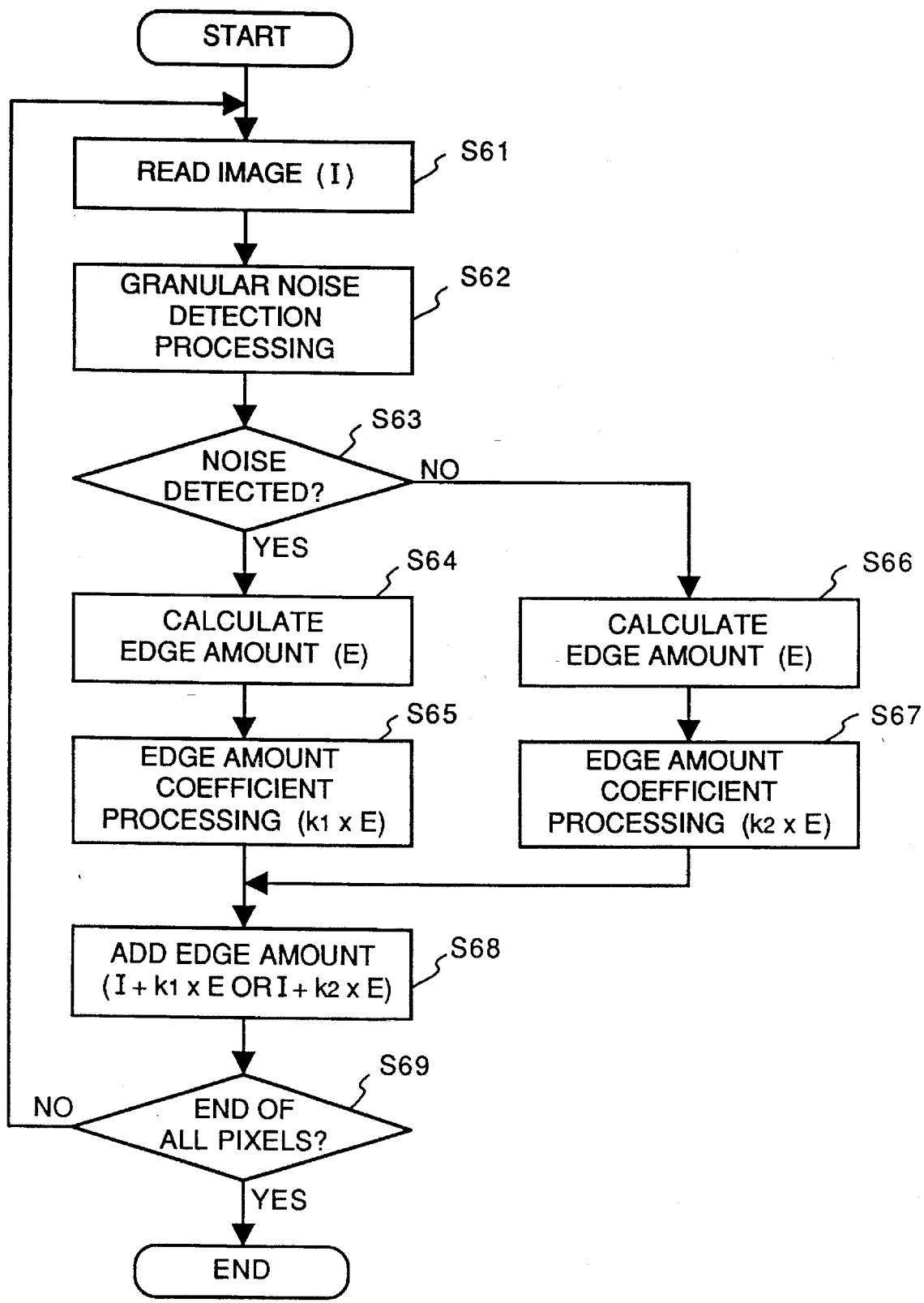
FIG. 35 is a flow chart showing a processing sequence of the circuit shown in FIG. 33.

FIG. 35 is a flow chart showing a processing sequence of this modification.

A binary image pattern in a block is extracted from image data read by the image reader 31 in step S61 by granular noise detection processing (step S62). When the image pattern coincides with a predetermined granular noise pattern (step S63), the edge amount is calculated (step S64), and thereafter, processing for selecting the coefficient $k_1$, and multiplying the edge amount with the selected coefficient is performed (step S65). If no noise is detected in step S63, the edge amount is calculated (step S66), and thereafter, processing for selecting the coefficient $k_2$, and multiplying the edge amount with the selected coefficient is performed (step S67). The edge amount obtained in this manner is then added to the image data (step S68). The above-mentioned processing is performed for all the pixels (step S69).

In this manner, according to the first modification, only a required image can be edge-emphasized by simple pattern matching processing, and granular noise generated when a recycle paper original is read can be reduced without influencing the resolution of an image.

In this modification, the number of coefficients to be selected is two. However, three or more coefficients may be prepared, and one of a noise pixel, an effective pixel, and an intermediate pixel may be determined as the discrimination result of the granular noise detection processor 32. A coefficient may be assigned according to the discrimination result, thus eliminating the influence caused by a discrimination error of the detection result.

<Second Modification>

Figure 36:
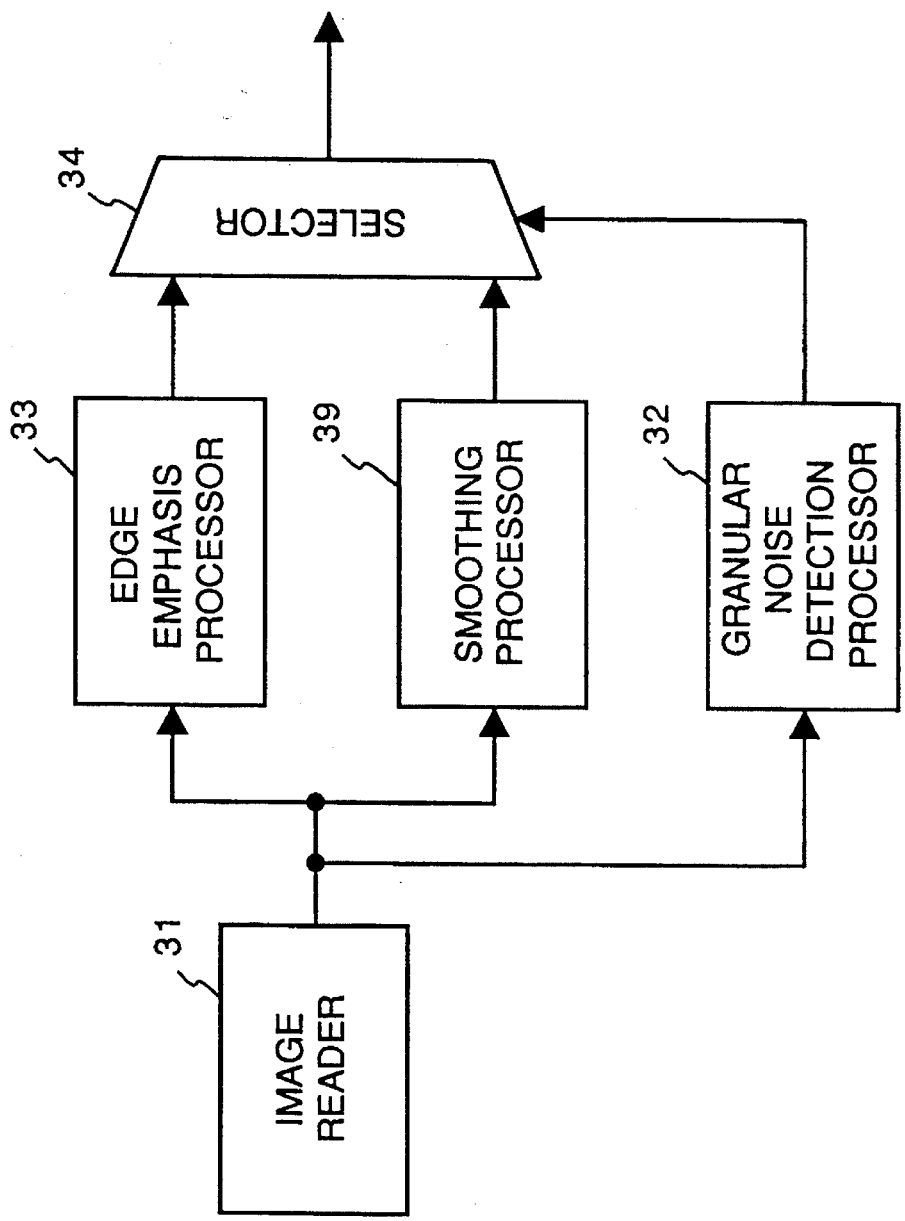
FIG. 36 is a block diagram showing an arrangement according to the second modification of the second embodiment.

FIG. 36 is a block diagram showing a basic arrangement according to the second modification of the second embodiment. In this modification, a smoothing processor 39 is added to the arrangement shown in FIG. 21 of the second embodiment described above. More specifically, in the second embodiment, as for a pixel detected as granular noise, data from the image reader 31 is directly selected and output by the selector 34. However, in this modification, as for the pixel detected as granular noise, data smoothed by the smoothing processor 39 is selected by the selector 34.

Since other arrangements are the same as those in the second embodiment, the same reference numerals in FIG. 36 denote the same parts as in FIG. 21, and a detailed description thereof will be omitted. The smoothing processor 39 will be described below.

The smoothing processor 39 is constituted by a pixel block extraction section 81 for extracting reference pixels, and an average value processor 82 for performing weighted average processing of a pixel of interest based on the reference pixels, as shown in FIG. 37. More specifically, for example, when output data from the signal line E shown in FIG. 24 is used as a pixel of interest, and a calculation is made using a filter having coefficients shown in FIG. 38, a weighted average value is calculated by the following calculation:

$$E_{AV}=\{4\times I_E+(I_B+I_D+I_F+I_H)\}/4$$

where $E_{AV}$ is the density of a pixel E subjected to average value processing, and $I_N$ is the density of a pixel N.

With the above-mentioned average value processing, a high-frequency component such as noise is attenuated.

FIG. 39 is a flow chart showing a processing sequence of this modification.

A binary image pattern in a block is extracted from image data read by the image reader 31 in step S71 by granular noise detection processing (step S72). When the image pattern coincides with a predetermined granular noise pattern (step S73), image data subjected to the average value processing is output (step S74); when no noise is detected, edge-emphasized image data is output (step S75). The above-mentioned processing is performed for all the pixels (step S76).

In this manner, according to the second modification, only a required image can be edge-emphasized by simple pattern matching processing, and granular noise generated when a recycle paper original is read can be reduced without influencing the resolution of an image.

Filter coefficients for edge emphasis and smoothing processing may be appropriately adopted, and any other coefficients may be used as long as they have high-frequency emphasis characteristics and high-frequency attenuation characteristics.

<Third Modification>

Figure 40:
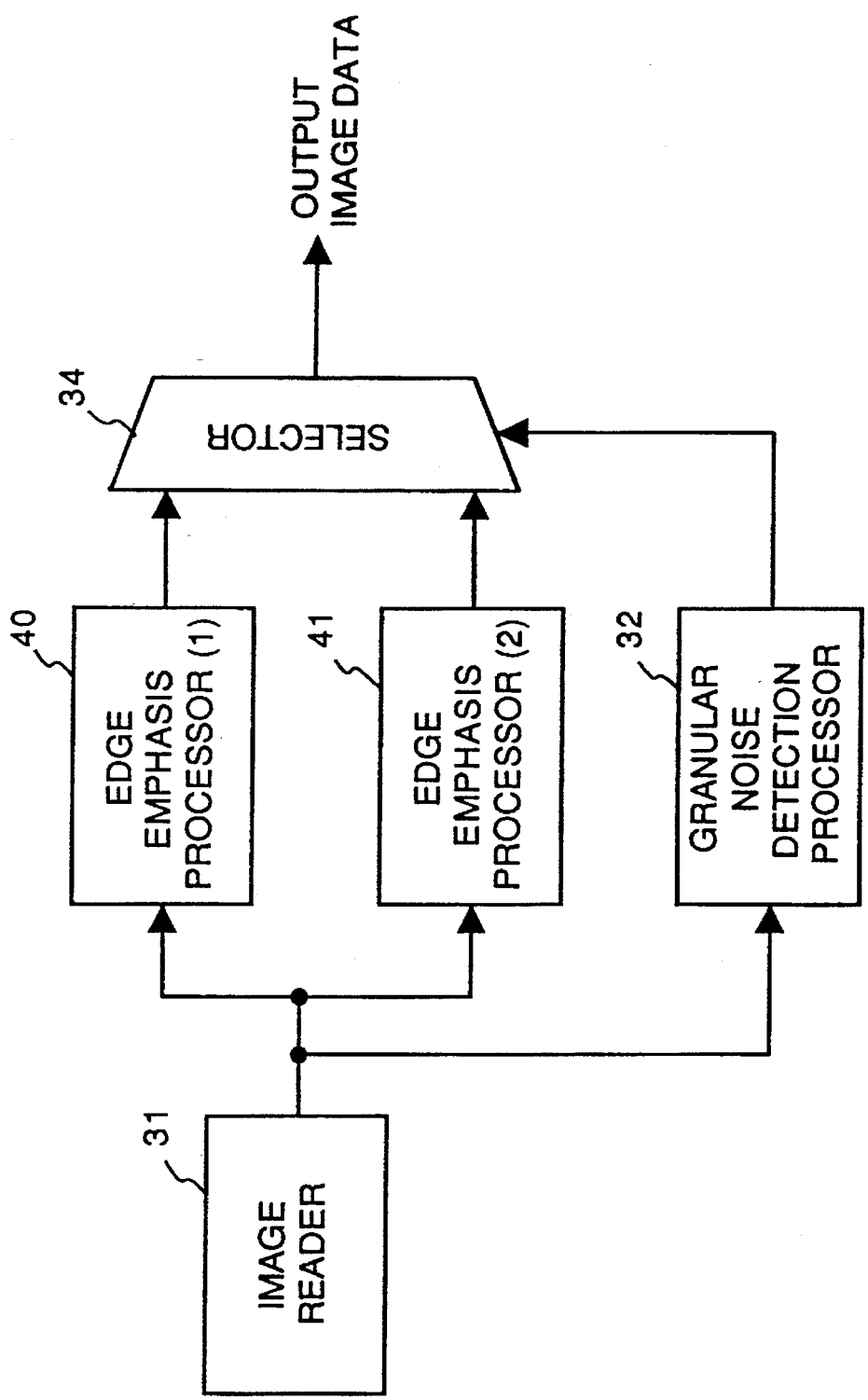
FIG. 40 is a block diagram showing an arrangement according to the third modification of the second embodiment.

FIG. 40 is a block diagram showing a basic arrangement according to the third modification of the second embodiment. In this modification, two edge emphasis processors 40 and 41 are arranged, and one of them is selected on the basis of the above-mentioned granular noise detection result. Since the arrangements of the image reader 31, the granular noise detection processor 32, and the selector 34 are the same as those in the second embodiment, the same reference numerals in FIG. 40 denote the same parts as in the second embodiment, and a detailed description thereof will be omitted. Each of the edge emphasis processors 40 and 41 also has the same arrangement as that shown in FIG. 30 of the second embodiment, except for an edge amount calculation method.

More specifically, the first edge emphasis processor 40 performs edge emphasis processing using the Laplacian filter shown in, e.g., FIG. 20. Therefore, the edge amount is calculated by the following formula:

$$E1_E=\{4\times I_E-(I_B+I_D+I_F+I_H)\}/4$$

where $E1_E$, is the edge amount of a pixel E, and $I_N$ is the density of a pixel N.

On the other hand, the second edge emphasis processor 41 performs edge emphasis processing using a filter shown in, e.g., FIG. 41. Therefore, the edge amount is calculated by the following formula:

$$E2_E=\{4\times I_E+(I_B+I_D+I_F+I_H)-2\times(I_A+I_C+I_G+I_I)\}/12$$

where $E2_E$ is the edge amount of a pixel E, and $I_N$ is the density of a pixel N.

For example, when an image determined as a granular noise image, as shown in FIG. 42, is edge-emphasized, the edge amount of the pixel of interest is $E1_E=16$, and $E_2E=16/3$.

On the other hand, when an image determined as a thin line image, as shown in FIG. 43, is edge-emphasized, the edge amount of the pixel of interest is $E1_E=8$, and $E_2E=8$.

Therefore, the second edge emphasis processing is performed for an image determined as a noise pixel, thus reducing the influence of noise.

Figure 44:
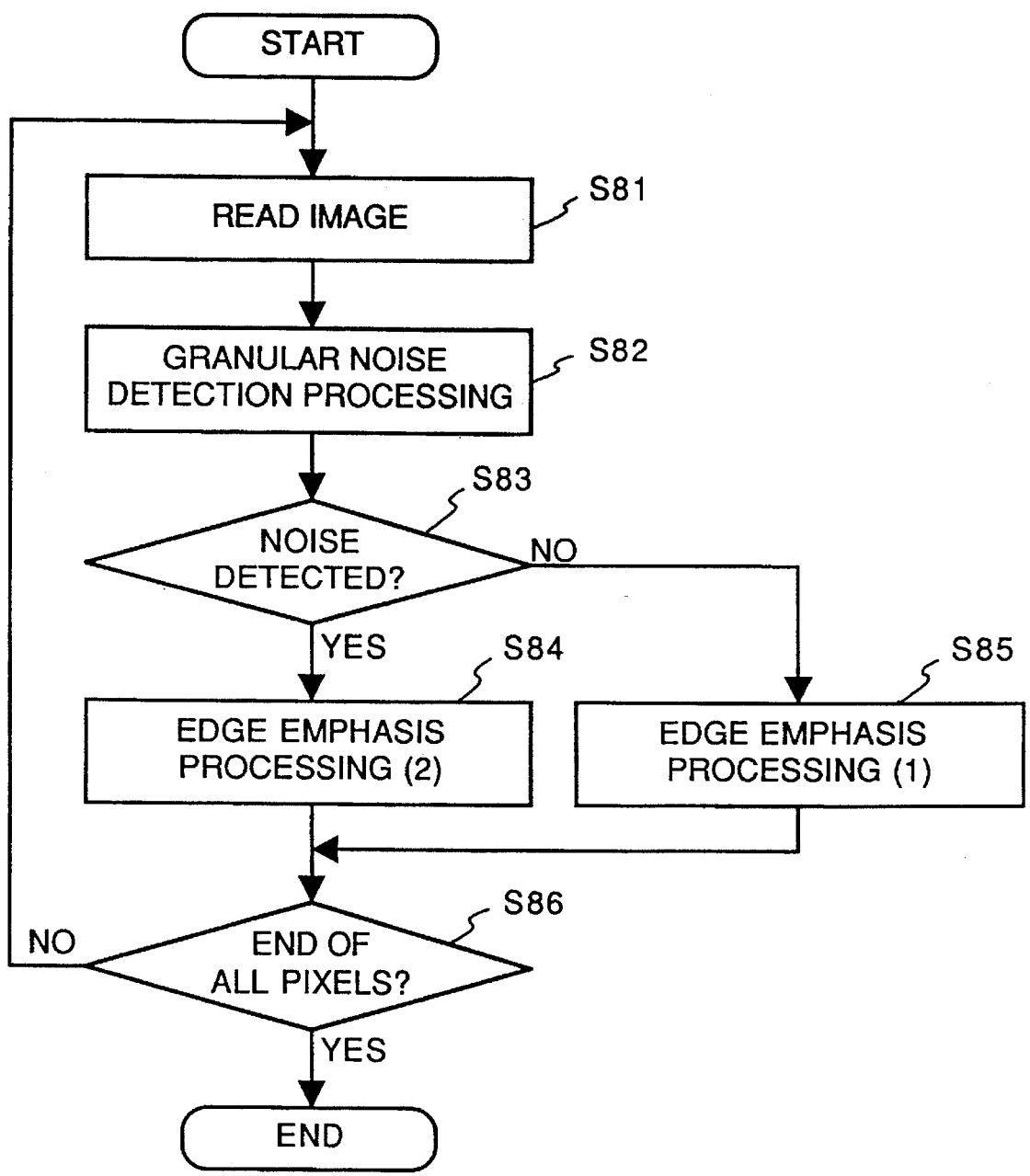
FIG. 44 is a flow chart showing a processing sequence of the circuit shown in FIG. 40.

FIG. 44 is a flow chart showing a processing sequence of this modification.

A binary image pattern in a block is extracted from image data read by the image reader 31 in step S81 by granular noise detection processing (step S82). When the image pattern coincides with a predetermined granular noise pattern (step S83), image data subjected to the second edge emphasis processing is output (step S84); when no noise is detected, image data subjected to the first edge emphasis processing is output (step S85). The above-mentioned processing is performed for all the pixels (step S86).

In this manner, according to the third modification, only a required image can be edge-emphasized by simple pattern matching processing, and granular noise generated when a recycle paper original is read can be reduced without influencing the resolution of an image.

Even when a discrimination error occurs in granular noise detection, since edge emphasis is performed by any edge emphasis processing means, deterioration of the resolution can be minimized.

In this embodiment, the arrangements of the filters are merely examples, and may be modified appropriately.

<Fourth Modification>

FIG. 45 is a block diagram showing a basic arrangement according to the fourth modification of the second embodiment. In this modification, a reading mode discrimination processor 42 is added to the arrangement shown in FIG. 21 of the second embodiment described above. The reading mode discrimination processor 42 detects by utilizing the detection processing result of the granular noise detection processor 32 whether or not a read image is an image on a recycle paper original. More specifically, the "mode" noted here means the type of a read original. In this modification, the image reader 31 has a so-called flat-bed type arrangement capable of re-reading a single original.

In this modification, the reading mode discrimination processor 42 performs discrimination by pre-scanning an original. If the processor 42 discriminates that an original is a recycle paper original, a re-reading operation without edge emphasis is performed; otherwise, a re-reading operation with edge emphasis is performed.

Since other arrangements are the same as those in the second embodiment, the same reference numerals in FIG. 45 denote the same parts as in the second embodiment, and a detailed description thereof will be omitted.

Figure 46:
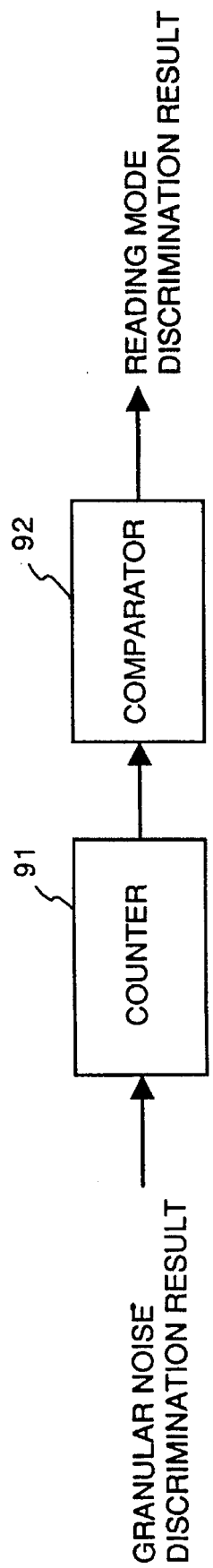
FIG. 46 is a block diagram showing an arrangement of a reading mode discrimination processor 42 shown in FIG. 45.

FIG. 46 is a block diagram showing an arrangement of the reading mode discrimination processor 42.

The reading mode discrimination processor 42 comprises a counter 91 for counting the detection processing results of the granular noise detection processor 32 for one original page, and a comparator 92 for comparing the count value with a predetermined threshold value. When the count value exceeds the threshold value, i.e., when the number of granular noise pixels in one page exceeds a predetermined value, it is determined that the original is a recycle paper original.

Figure 47:
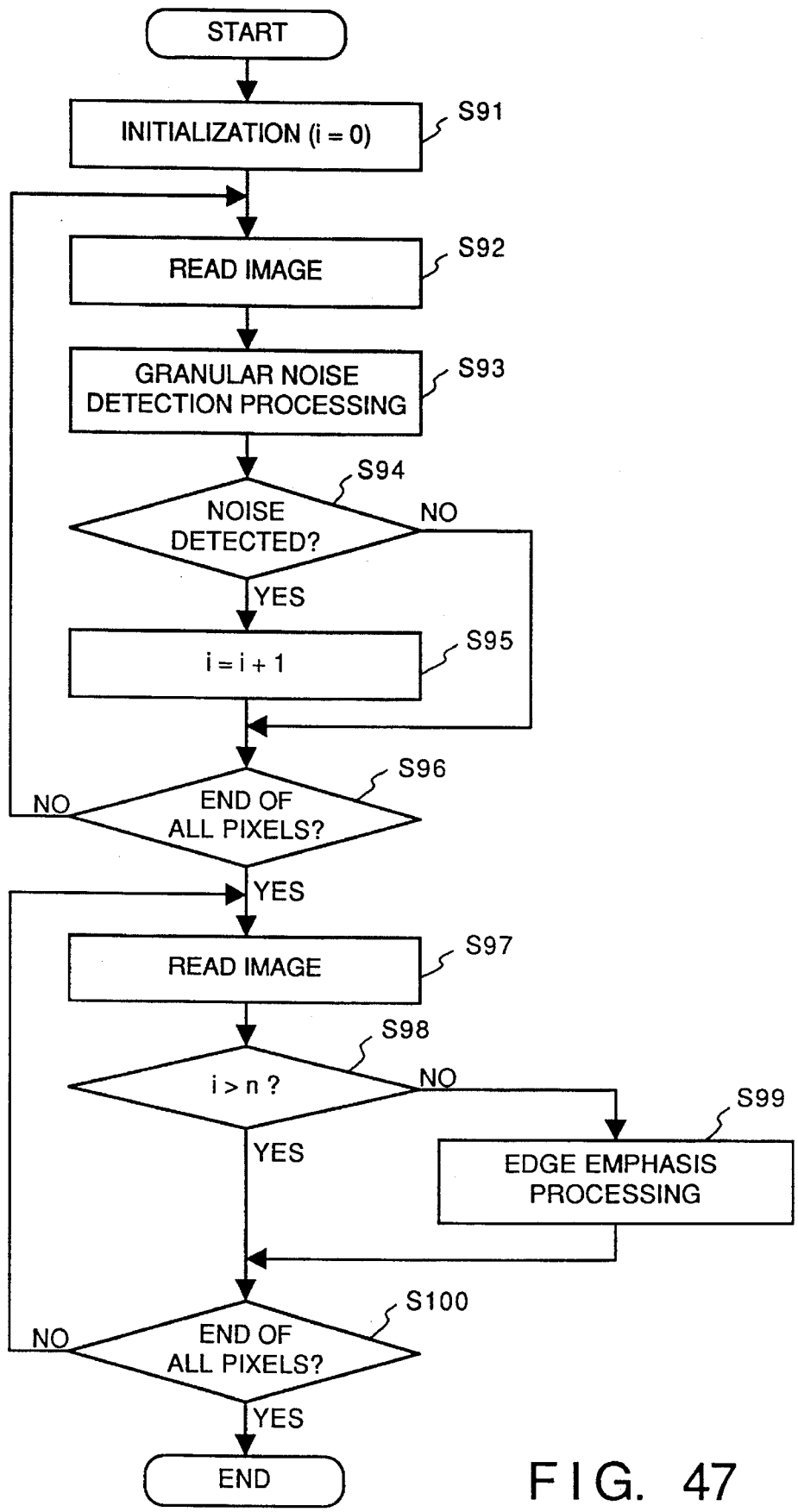
FIG. 47 is a flow chart showing a processing sequence of the circuit shown in FIG. 45.

FIG. 47 is a flow chart showing a processing sequence of this modification.

Before the processing is started, an internal counter, and the like are initialized in step S91, and the pre-scan operation of the image reader 31 is started to read an original (step S92). A binary image pattern in a block is extracted from the read image data by granular noise detection processing (step S93). When the image pattern coincides with a predetermined granular noise pattern (step S94), the content of the counter 91 in the reading mode discrimination processor 42 is incremented by one (S95). The above-mentioned processing is performed for all the pixels in one page (step S96).

The re-reading operation is started (step S97), and it is then checked if a count result i of the counter 91 is larger than a predetermined setting value n (step S98). If YES in step S98, it is determined that the original is a recycle paper original, and the image data from the image reader 31 is output without performing the above-mentioned edge emphasis processing (step S100). On the other hand, if NO in step S98, it is determined that the original is a normal original formed of so-called virgin paper, and edge-emphasized image data is output (step S99). The above-mentioned processing is executed for all the pixels (step S96).

In this manner, according to the fourth modification, it is checked by the pre-scan operation if the original is a recycle paper original. If it is determined that the original is a recycle paper original, edge emphasis is inhibited, thus reducing granular noise.

In this modification, original discrimination is performed by pre-scanning pixels on the entire page. However, discrimination may be made by checking a specific region on, e.g., the leading end portion of an original.

<Fifth Modification>

Figure 48:
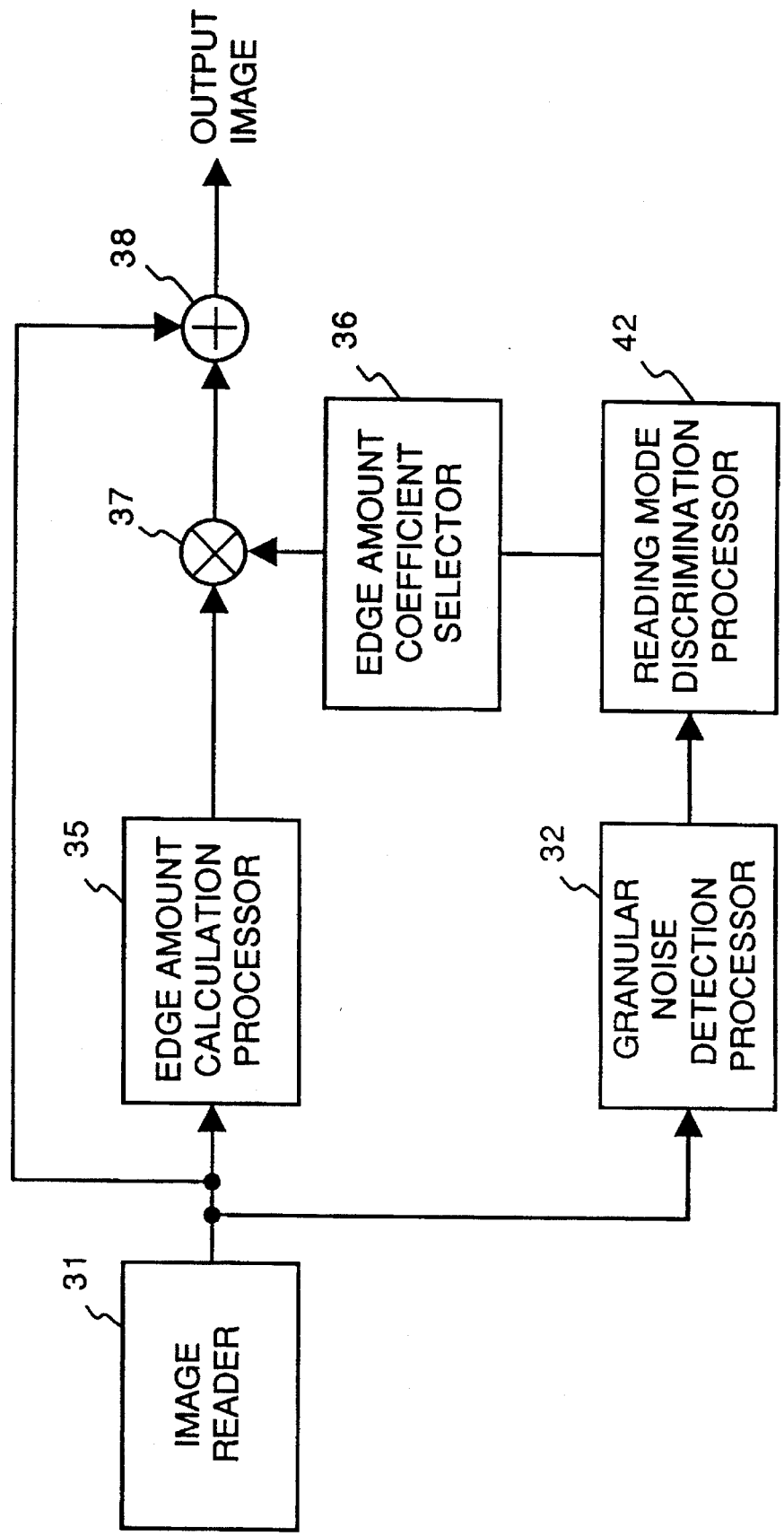
FIG. 48 is a block diagram showing an arrangement according to the fifth modification of the second embodiment.

FIG. 48 is a block diagram showing a basic arrangement according to the fifth modification of the second embodiment. In this modification, the same reading mode discrimination processor 42 as in the fourth modification is added to the arrangement shown in FIG. 33 of the first modification. More specifically, the reading mode discrimination processor 42 is connected to the output side of the above-mentioned granular noise detection processor 32, and supplies its discrimination output to the above-mentioned edge amount coefficient selector 36. Also, in this modification, the image reader 31 has a so-called flat-bed type arrangement capable of re-reading a single original.

Since other arrangements are the same as those in the first modification, the same reference numerals in FIG. 48 denote the same parts as in the first modification, and a detailed description thereof will be omitted.

Figure 49:
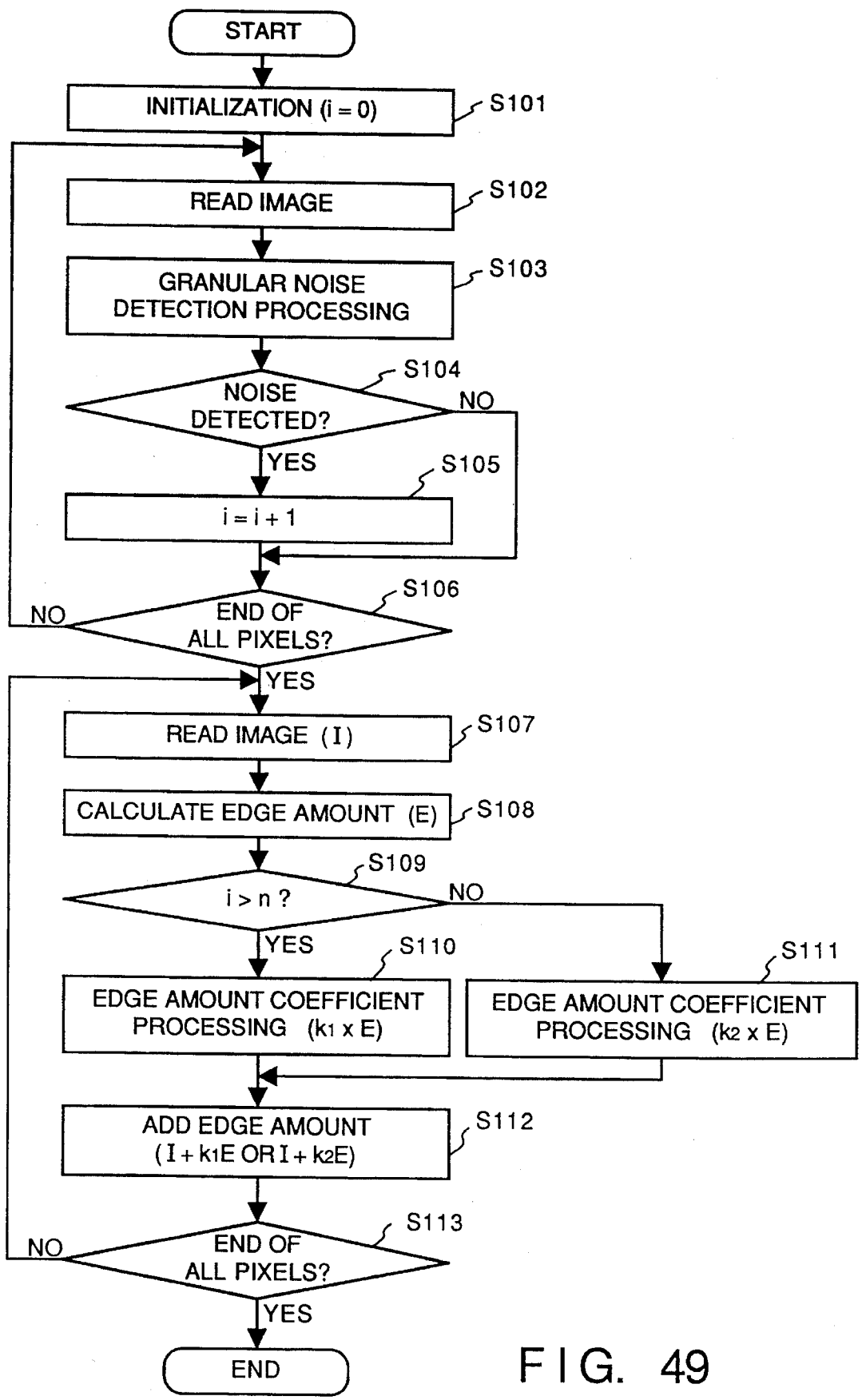
FIG. 49 is a flow chart showing a processing sequence of the circuit shown in FIG. 48.

FIG. 49 is a flow chart showing a processing sequence of this modification.

Before the processing is started, an internal counter, and the like are initialized in step S101, and the pre-scan operation of the image reader 31 is started to read an original (step S102). A binary image pattern in a block is extracted from the read image data by granular noise detection processing (step S103). When the image pattern coincides with a predetermined granular noise pattern (step S104), the content of the counter 91 in the reading mode discrimination processor 42 is incremented by one (S105). Thereafter, the above-mentioned processing is performed for all the pixels in one page (step S106).

The re-reading operation is started (step S107). The edge amount is calculated (step S108), and it is then checked if a count result i of the counter 91 is larger than a predetermined setting value n (step S109). If YES in step S109, it is determined that the original is a recycle paper original, and processing for selecting the above-mentioned coefficient $k_1$, and multiplying the edge amount with the selected coefficient is performed (step S110).

If it is determined in step S109 that the count result i is equal to or smaller than n, it is determined that the original is a normal original, and processing for selecting the above-mentioned coefficient $k_2$, and multiplying the edge amount with the selected coefficient is performed (step S111). The edge amount calculated in this manner is added to the image data (step S112). The above-mentioned processing is performed for all the pixels (step S113).

In this manner, according to the fifth modification, it is discriminated by the pre-scan operation if the original is a recycle paper original, and the coefficient for the edge amount is adjusted according to the discrimination result, thus reducing granular noise on a recycle paper original.

In this modification, like in the first modification, three or more coefficients may be prepared in place of the two coefficients, and may be assigned to three or more discrimination results.

<Sixth Modification>

FIG. 50 is a block diagram showing a basic arrangement according to the sixth modification of the second embodiment. In this modification, the same reading mode discrimination processor 42 as in the fourth modification is added to the arrangement shown in FIG. 40 of the third modification. More specifically, the reading mode discrimination processor 42 is connected to the output side of the above-mentioned granular noise detection processor 32, and supplies its discrimination output to the above-mentioned selector 34. The selector 34 selects one of the two edge emphasis processors 40 and 41 according to the discrimination result from the reading mode discrimination processor 42. Also, in the sixth modification, the image reader 31 has a so-called flat-bed type arrangement capable of re-reading a single original. Since other arrangements are the same as those in the third modification, the same reference numerals in FIG. 50 denote the same parts as in the third modification, and a detailed description thereof will be omitted.

Figure 51:
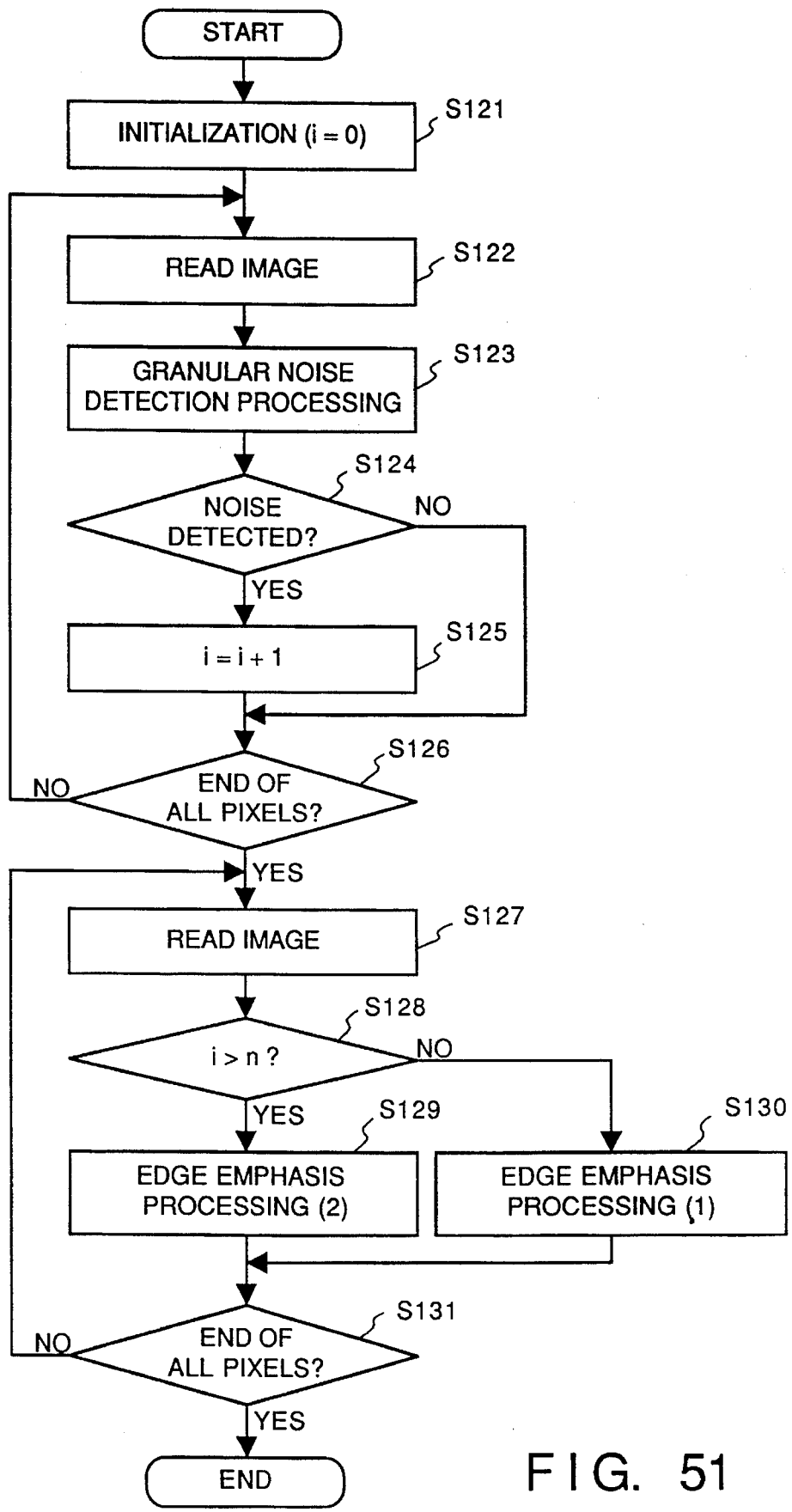
FIG. 51 is a flow chart showing a processing sequence of the circuit shown in FIG. 50.

FIG. 51 is a flow chart showing a processing sequence of this modification.

Before the processing is started, an internal counter, and the like are initialized in step S121, and the pre-scan operation of the image reader 31 is started to read an original (step S122). A binary image pattern in a block is extracted from the read image data by granular noise detection processing (step S123). When the image pattern coincides with a predetermined granular noise pattern (step S124), the content of the counter 91 in the reading mode discrimination processor 42 is incremented by one (S125). Thereafter, the above-mentioned processing is performed for all the pixels in one page (step S126).

The re-reading operation is started (step S127), and it is then checked if a count result i of the counter 91 is larger than a predetermined setting value n (step S128). If YES in step S128, it is determined that the original is a recycle paper original, and the above-mentioned second edge emphasis processor 41 is selected to output image data (step S129).

If it is determined in step S128 that the count result i is equal to or smaller than the setting value n, it is determined that the original is a normal original, and the above-mentioned first edge emphasis processor 40 is selected to output image data (step S130). The above-mentioned processing is performed for all the pixels (step S131).

In this manner, according to the sixth modification, it is discriminated by the pre-scan operation if the original is a recycle paper original, and the edge emphasis processing is selected according to the discrimination result, thus reducing granular noise on a recycle paper original.

As described above, according to the second embodiment, since a function of detecting granular noise of an original image is provided, edge emphasis processing can be performed by selecting an effective image, and granular noise generated when, e.g., a recycle paper original is read can be reduced without influencing the resolution of an image.

<Third Embodiment>

Figure 52:
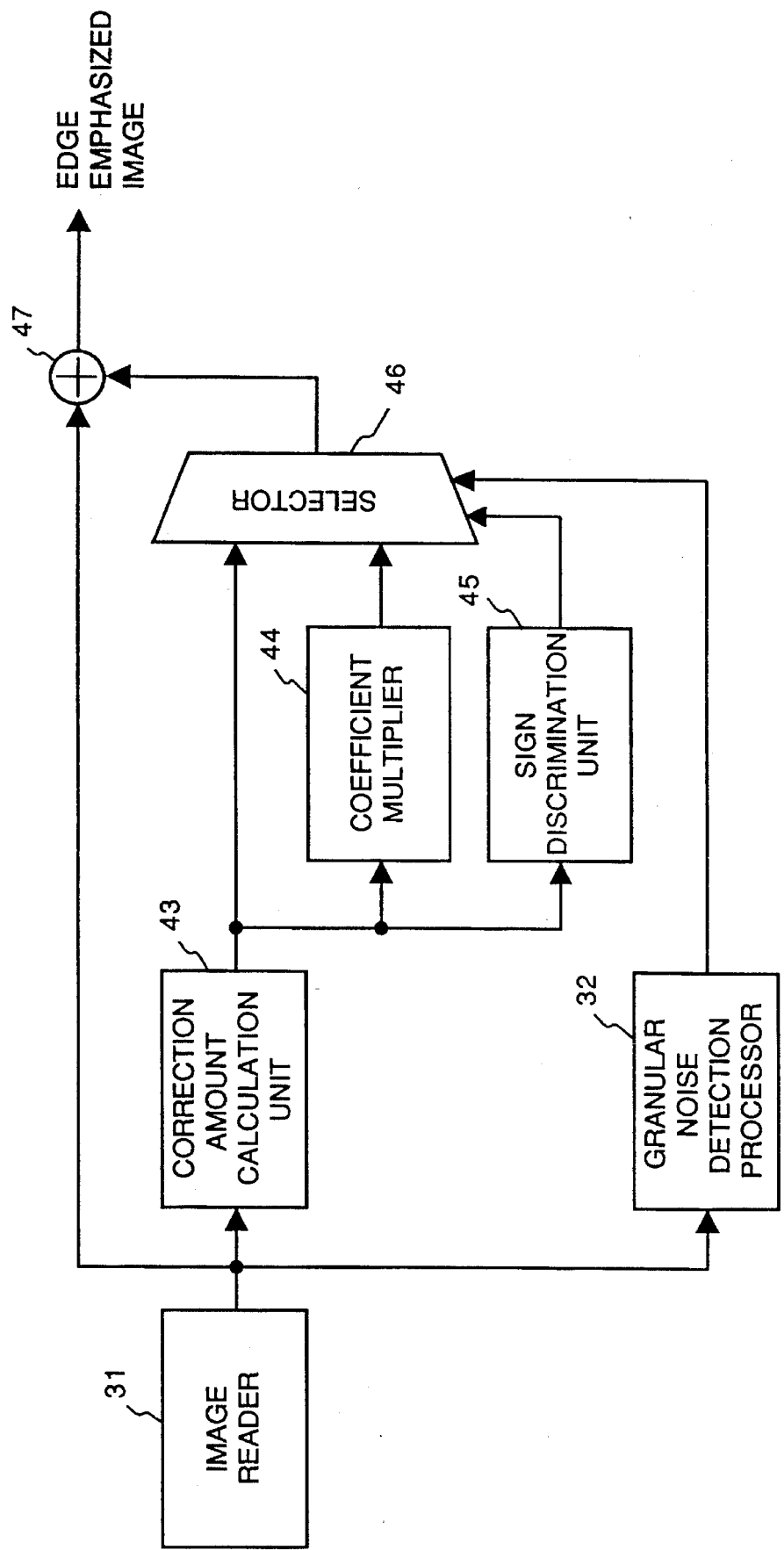
FIG. 52 is a block diagram showing a basic arrangement according to the third embodiment of the present invention.

FIG. 52 is a block diagram showing a basic arrangement according to the third embodiment of the present invention. In FIG. 52, reference numeral 31 denotes an image reader, which has a function of A/D converting read analog data into digital data after shading correction processing and the like. In the embodiment to be described below, image data obtained by the reader 31 will be explained as density data. More specifically, when a data value is large, the data is processed as black data. Reference numeral 32 denotes a granular noise detection processor for discriminating based on the read image data whether or not a pixel of interest is a granular noise pixel generated when a recycle paper original is read. Reference numeral 43 denotes a correction amount calculation unit for edge emphasis processing. The unit 43 calculates a correction amount for correcting the value of a pixel of interest on the basis of the pixel of interest and its surrounding pixels. Reference numeral 44 denotes a coefficient multiplier for multiplying the correction value obtained by the correction amount calculation unit 43 with a predetermined coefficient equal to or smaller than "1".

Reference numeral 45 denotes a sign discrimination unit for discriminating the sign of the above-mentioned correction value. Reference numeral 46 denotes a selector for selecting a correction amount to be added to the read image data on the basis of the discrimination results from the sign discrimination unit 45 and the granular noise detection processor 32. More specifically, when the sign discrimination result indicates "−", the selector 46 selects the result obtained by the above-mentioned correction amount calculation unit 43 regardless of the granular noise detection result. On the other hand, when the sign discrimination result indicates "+", the selector 46 selects a desired correction amount according to the granular noise detection result. More specifically, when it is determined that the pixel of interest is a noise pixel, the selector 46 selects the correction value output from the coefficient multiplier 44; when it is determined that the pixel of interest is an effective pixel (i.e., other than granular noise), it selects the correction value output from the correction amount calculation unit 43. The selected correction value is added to the read image data by an adder 47, thus executing edge emphasis processing for eliminating the influence of granular noise.

When only a recycle paper original is to be processed, an isolated black pixel need only be considered as granular noise, and an isolated white pixel need not be considered. Therefore, in this embodiment, as described above, only when the sign of the correction value to be added to a read image is positive, the edge emphasis amount is controlled by utilizing the granular noise discrimination result (i.e., generation of only an isolated black pixel is eliminated).

The processing operations of the above-mentioned units will be described in detail below. Since the arrangements of the image reader 31 and the granular noise detection processor 32 are the same as those in the second embodiment described above, a detailed description thereof will be omitted.

Figure 53:
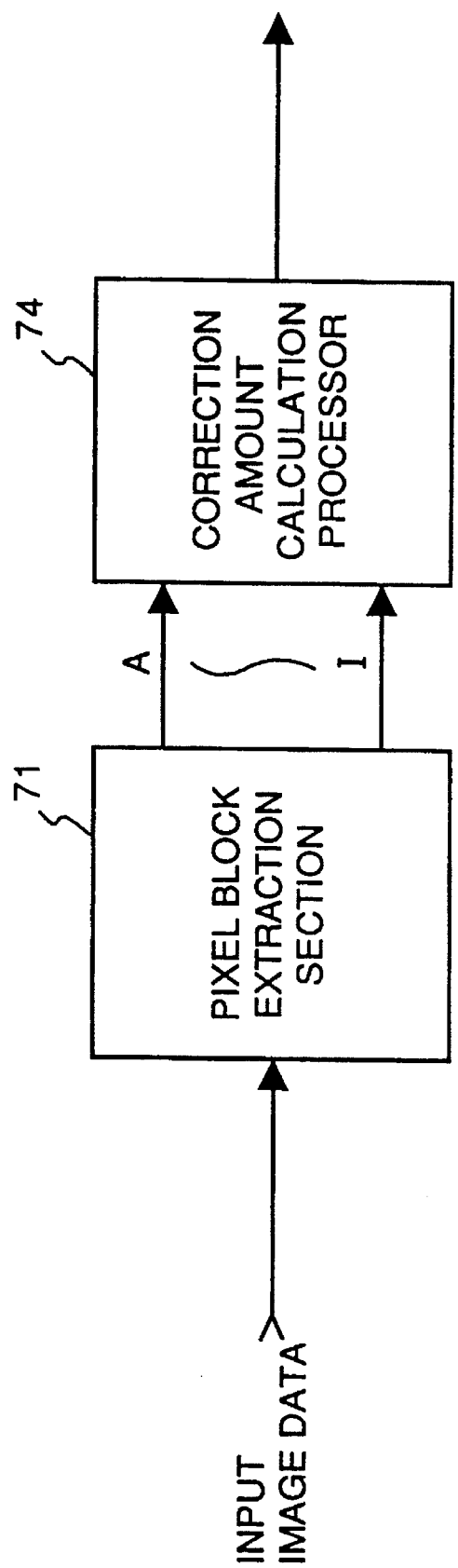
FIG. 53 is a diagram showing an arrangement of a correction amount calculation processor 43 shown in FIG. 52.

The correction amount calculation unit 43 is constituted by a pixel block extraction section 71 (having the same arrangement as that shown in FIG. 25) for extracting reference pixels, and a correction amount calculation processor 74 for calculating a correction amount for edge-emphasizing a pixel of interest on the basis of the value of the pixel of interest and the values of its surrounding reference pixels, as shown in FIG. 53. More specifically, in a calculation using the Laplacian filter having coefficients shown in FIG. 20, the correction amount is calculated by the following formula using E in FIG. 24 as a pixel of interest:

$$E_E = \{4 \times I_E - (I_B + I_D + I_F + I_H)\}/4$$

where $E_E$ is the correction amount of a pixel E, and $I_N$ is the density of a pixel N.

This formula can be easily realized with a wired logic. Edge emphasis is performed by adding the calculated correction amount to the pixel of interest. For example, when the above-mentioned calculation is performed for pixels shown in FIG. 2V, the correction value for the pixel of interest is calculated by:

$$E_E = \{4 \times 20 - (2+2+1)\}/4 = 18$$

(decimal part is rounded off)

When this value is directly added to the pixel of interest (its value=38), a black pixel is reproduced by binary conversion processing.

Figures 27, 28:
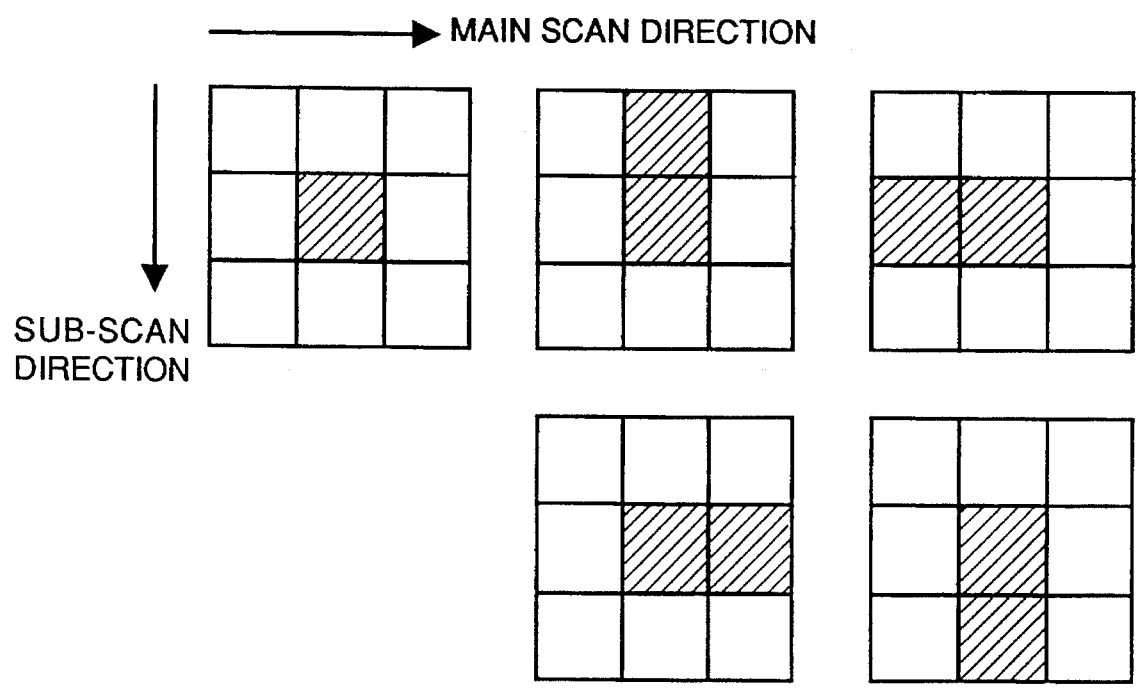
FIG. 27 is a matrix showing an example of a granular noise image.
FIG. 28 is a view showing granular noise discrimination patterns.

The coefficient multiplier 44 multiplies the calculated correction amount with a predetermined coefficient equal to or smaller than "1". More specifically, edge emphasis processing with a decreased edge emphasis amount is performed. More specifically, when the coefficient is set to be ½, the value of the pixel of interest of the image shown in FIG. 27 is (20+9=29), and this pixel is not reproduced by binary conversion processing.

The sign discrimination unit 45 discriminates whether the correction amount calculation result $E_E$ is positive or negative. More specifically, the unit 45 outputs the sign bit of the calculated data.

The selector 46 is a data selector, and selects and outputs one of the above-mentioned two correction amounts according to the discrimination results from the sign discrimination unit 45 and the granular noise detection processor 32. Table 1 below summarizes the selection condition of the selector 46.

TABLE 1

|  |  | Sign Discrimination | |
|---|---|---|---|
|  |  | + | − |
| Granular Noise | Detected | Coefficient Multiplied Result | Correction Amount Calculation Result |
|  | Not Detected | Correction Amount Calculation Result | Correction Amount Calculation Result |

More specifically, when the sign of the correction value is positive, and granular noise is detected, the correction value multiplied with the coefficient is selected (the edge emphasis amount is reduced).

The selection result is added to the original image by the adder 47, thus executing the edge emphasis processing.

With the above-mentioned processing, the edge emphasis processing for reducing granular noise on a recycle paper original is performed. In, e.g., a facsimile machine, the processed output image data is encoded after binary conversion processing, and the encoded data is output onto a communication line.

Figure 54:
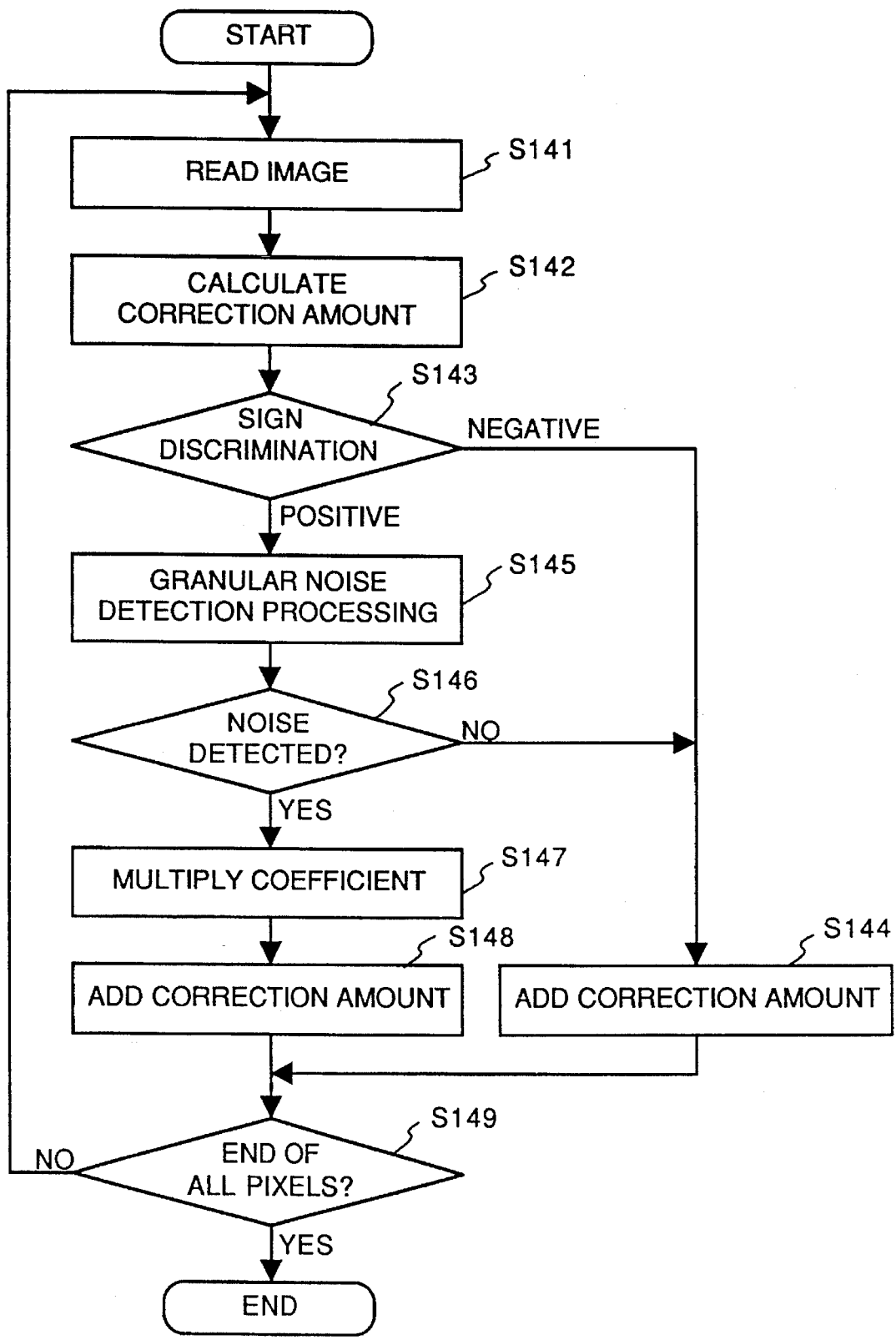
FIG. 54 is a flow chart showing a processing sequence of the circuit shown in FIG. 52.

The processing of this embodiment will be described below with reference to the flow chart shown in FIG. 54. Image data is read by the image reader 31 (step S141), and the correction value for edge emphasis is calculated (step S142). The sign of the obtained correction value is discriminated (step S143). If the sign is negative, the correction value is directly added to the read pixel (step S144). However, if the sign is positive, it is checked according to the result of the granular noise detection processing (step S145) whether or not the pixel of interest is a granular noise pixel (step S146). If it is determined that the pixel of interest is a granular noise pixel, the calculated correction value is multiplied with the coefficient (<1) (step S147). The correction value multiplied with the coefficient is added to the pixel of interest (step S148). On the other hand, if it is determined that the pixel of interest is not a granular noise pixel, the calculated correction value is directly added to the pixel of interest (step S144). The above-mentioned processing is performed for all the pixels (step S149), thus ending processing.

As described above, according to the third embodiment, the influence on the resolution and reproducibility of an image can be minimized by simple pattern matching processing, and granular noise generated when a recycle paper original is read can be reduced.

In the above embodiment, density data is exemplified as image data. Alternatively, if luminance data is used, substantially the same processing may be performed, except that the sign of the sign discrimination result is inverted.

The present invention can be applied to either a system constituted by a plurality of devices, or an apparatus consisting of one device.

The present invention can also be applied to a case wherein the invention is achieved by supplying a program to a system or apparatus.

The present invention has been described with reference its preferred embodiments. However, the present invention is not limited to the above embodiments, and various changes and modifications may be made within the scope of the appended claims.

What is claimed is:

1. An image processing apparatus comprising:

instruction means for instructing paper quality of an original to be read by reading means; and edge emphasis means for edge-emphasizing read image data according to the paper quality instructed by said instruction means, wherein said edge emphasis means comprises first and second edge emphasis means for edge-emphasizing the image data, and selection means for selection one of said first and second edge emphasis means according to the paper quality instructed by said instruction means.

2. The apparatus according to claim 1, wherein when said instruction means instructs recycle paper, said selection means selects said first edge emphasis means having a smaller degree of edge emphasis.

3. An image processing apparatus comprising:

instruction means for instruction paper quality of an original to be read by reading means; and edge emphasis means for edge-emphasizing read image data according to the paper quality instructed by said instruction means, wherein when said instruction means instructs high-quality paper, said edge emphasis means edge-emphasizes the image data.

4. An image processing apparatus comprising:

instruction means for instructing paper quality of an original to be read by reading means; and edge emphasis means for edge-emphasizing read image data according to the paper quality instructed by said instruction means, wherein said edge emphasis means comprises calculation means for calculating an edge amount of the read image data, discrimination means for discriminating a sign of the edge amount calculated by said calculation means, and selection means for selecting according to a discrimination result from said discrimination means and the paper quality instructed by said instruction means whether or not edge emphasis is performed.

5. The apparatus according to claim 4, wherein when said instruction means instructs recycle paper, and the discrimination result from said discrimination means indicates a negative sign, said selection means selects to edge-emphasize the image data.

6. An image processing apparatus comprising:

reading means for reading an original, and outputting read image data;

instruction means for instructing paper quality of an original to be read by said reading means;

edge emphasis means for edge-emphasizing the read image data according to the paper quality instructed by said instruction means; and binary conversion means for binary-converting the image data edge-emphasizing by said edge emphasis means, and outputting the binary-converted data, wherein said edge emphasis means comprises first and second edge emphasis means for edge-emphasizing the image data, and selection means for selecting one of said first and second edge emphasis means according to the paper quality instructed by said instruction means.

7. An image processing apparatus comprising:

reading means for reading an image on an original;

detection means for detecting granular noise in image data read by said reading means; and edge emphasis means for edge-emphasizing the image data according to a detection result from said detection means, wherein said edge emphasis means comprises first and second edge emphasis means for edge-emphasizing the image data, and selection means for selecting one of said first and second edge emphasis means according to the detection result from said detection means.

8. An image processing apparatus comprising:

reading means for reading an image on an original;

detection means for detecting granular noise in image data read by said reading means; and edge emphasis means for edge-emphasizing the image data according to a detection result from said detection means, wherein said edge emphasis means comprises calculation means for calculating an edge amount of the read image data, selection means for selecting an edge emphasis coefficient according to the detection result from said detection means, multiplier means for multiplying the edge amount with the coefficient selected by said selection means, and adder means for adding the product from said multiplier means to the image data.

9. An image processing apparatus comprising:

reading means for reading an image on an original;

detection means for detecting granular noise in image data read by said reading means;

edge emphasis means for edge-emphasizing the image data;

smoothing means for smoothing the image data; and selection means for selecting the image data processed by one of said edge emphasis means and said smoothing means on the basis of a detection result from said detection means.

10. An image processing apparatus comprising:

reading means for reading an image on an original;

detection means for detecting granular noise in image data read by said reading means;

first edge emphasis means for performing first edge emphasis for the image data; second edge emphasis means for performing second edge emphasis for the image data; and selection means for selecting the image data edge-emphasized by one of said first and second edge emphasis means on the basis of a detection result from said detection means.

11. An image processing apparatus comprising:

reading means for reading an image on an original;

detection means for detecting granular noise in image data read by said reading means;

discrimination means for discriminating a type of original according to a detection result from said detection means; and edge emphasis means for edge-emphasizing the image data according to a discrimination result from said discrimination means, wherein the type of original is discriminated by said discrimination means during a pre-scan operation, and whether or not edge emphasis is performed by said edge emphasis means is selected according to the discrimination result.

12. The apparatus according to claim 11, wherein said edge emphasis means comprises calculation means for calculating an edge amount of the read image data, selection means for selecting an edge emphasis coefficient according to the discrimination result from said discrimination means, multiplier means for multiplying the edge amount with the coefficient selected by said selection means, and adder means for adding the product from said multiplier means to the image data.

13. An image processing apparatus comprising:

reading means for reading an image on an original;

detection means for detecting granular noise in image data read by said reading means;

discrimination means for discriminating a type of original according to a detection result from said detection means; and first and second edge emphasis means for edge-emphasizing the image data according to a discrimination result from said discrimination means, wherein the type of original is discriminated by said discrimination means during a pre-scan operation, and one of said first and second edge emphasis means is selected according to the discrimination result.

14. An image processing apparatus for performing edge emphasis processing for pixels of a read original image, comprising:

detection means for detecting granular noise generated when a recycle paper original is read;

calculation means for calculating a correction amount for edge emphasis with respect to read pixels;

discrimination means for discriminating a sign of the correction amount calculated by said calculation means;

multiplier means for multiplying the correction amount with a predetermined coefficient;

selection means for selecting one of the correction amount and the correction amount multiplied with the coefficient according to the detection result from said detection means and the discrimination result from said discrimination means; and adder means for adding the correction amount selected by said selection means to a pixel of interest.

15. An image processing method comprising:

the reading step of reading an original, and outputting read image data;

the instruction step of instructing paper quality of an original to be read in the reading step;

the edge emphasis step of edge-emphasizing the read image data according to the paper quality instructed the instruction step; and the binary conversion step of binary-converting the image edge-emphasized in the edge emphasis step, and outputting the binary-converted data, wherein said edge emphasis step comprises first and second edge emphasis step for edge-emphasizing the image data, and selection step for selecting one of said first and second edge emphasis step according to the paper quality instructed by said instruction step.

16. An image processing method comprising:

the reading step of reading an image on an original;

the detection step of detecting granular noise in image data read in the reading step; and the edge emphasis step of edge-emphasizing the image data according to a detection result in the detection step, wherein said edge emphasis step comprises first and second edge emphasis step for edge-emphasizing the image data, and selection step for selecting one of said first and second edge emphasis step according to the paper quality instructed by said instruction step.

17. An image processing apparatus comprising:

reading means for reading an image on an original;

detection means for detecting granular noise in image data read by said reading means; and edge emphasis means for edge-emphasizing the image data according to a detection result from said detection means, wherein said detection means does not detect granular noise, said edge emphasis means edge-emphasizes the image data.

* * * * *